United States Patent
Mass et al.

(10) Patent No.: US 8,113,306 B2
(45) Date of Patent: Feb. 14, 2012

(54) CONTROL SYSTEM FOR A WORK UNIT

(75) Inventors: Cory Mass, Altoona, IA (US); Curt Graham, Lynville, IA (US); Matthew Hutchinson, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 12/540,508

(22) Filed: Aug. 13, 2009

(65) Prior Publication Data
US 2010/0038155 A1    Feb. 18, 2010

Related U.S. Application Data

(60) Provisional application No. 61/089,304, filed on Aug. 15, 2008.

(51) Int. Cl.
*B62D 51/04* (2006.01)
(52) U.S. Cl. .................. 180/19.1; 180/19.2; 180/19.3
(58) Field of Classification Search .................. 180/19.1, 180/19.2, 19.3
See application file for complete search history.

(56) References Cited

U.S. PATENT DOCUMENTS

| | | | |
|---|---|---|---|
| 2,484,264 A | 10/1949 | Barnes | |
| 2,514,917 A | 7/1950 | Walstrom | |
| 2,766,834 A | 10/1956 | Boyer | |
| 3,465,841 A | 9/1969 | Pulskamp et al. | |
| 3,893,530 A | 7/1975 | Gordon | |
| 3,896,892 A | 7/1975 | Kohls et al. | |
| 4,392,538 A | 7/1983 | Goertzen | |
| 4,396,067 A | 8/1983 | Enters et al. | |
| 5,020,308 A | 6/1991 | Braun et al. | |
| 5,181,579 A | 1/1993 | Gilliem | |
| 5,212,896 A | * 5/1993 | Hillard et al. | |
| 5,496,226 A | 3/1996 | Splittstoesser et al. | |

(Continued)

FOREIGN PATENT DOCUMENTS

| JP | 5-278491 | * 10/1993 |
|---|---|---|
| JP | 2006-224773 | * 8/2006 |
| KR | 10-2007-0100653 | * 10/2007 |

OTHER PUBLICATIONS

All Hydraulic Four Wheel Drive (4WD) Heavy Duty Trencher, http://www.barretomfg.com/four-wheel-drive-heavy-duty-trencher.php, 2 pages (Date Printed Oct. 31, 2008).

(Continued)

*Primary Examiner* — Paul N Dickson
*Assistant Examiner* — Marlon Arce
(74) *Attorney, Agent, or Firm* — Merchant & Gould P.C.

(57) ABSTRACT

The present disclosure relates to a work unit with power turning. The work unit includes a frame having a first end, a second end and left and right sides that extend between the first and second ends. A work element is carried by the frame. A left propulsion element is positioned at the left side of the frame and a right propulsion element is positioned at the right side of the frame. A drive arrangement is carried by the frame for driving the left and right propulsion elements. The work unit also includes left and right spaced-apart leverage arms that project outwards from the second end of the frame. At least one of the left and right leverage arms is operatively connected to the drive arrangement such that pressure applied by an operator to the left or right leverage arms in a left or right direction causes the drive arrangement to turn the work unit.

15 Claims, 34 Drawing Sheets

U.S. PATENT DOCUMENTS

| | | | |
|---|---|---|---|
| 5,644,903 | A | 7/1997 | Davis, Jr. |
| 5,657,828 | A | 8/1997 | Nagamachi |
| 5,915,487 | A | 6/1999 | Splittstoesser et al. |
| 6,098,385 | A * | 8/2000 | Turk ............................. 56/11.3 |
| 6,460,640 | B1 | 10/2002 | Keagle et al. |
| 6,564,481 | B2 | 5/2003 | Wakitani et al. |
| 6,640,526 | B2 * | 11/2003 | Velke et al. ................... 56/10.8 |
| 6,709,223 | B2 | 3/2004 | Walto et al. |
| 6,874,581 | B1 | 4/2005 | Porter et al. |
| 6,902,016 | B2 | 6/2005 | Bares et al. |
| 7,059,434 | B2 | 6/2006 | Bares et al. |
| 7,596,934 | B2 * | 10/2009 | Waesche et al. ............... 56/11.9 |
| 7,740,091 | B2 * | 6/2010 | Bartel .......................... 180/6.48 |
| 7,789,187 | B2 * | 9/2010 | Zerhusen et al. ............ 180/323 |
| 7,805,864 | B2 * | 10/2010 | Azure et al. ................... 37/352 |
| 7,827,634 | B2 * | 11/2010 | Stroth et al. ...................... 5/510 |
| 7,828,092 | B2 * | 11/2010 | Vogel et al. .................. 180/19.3 |
| 2007/0068711 | A1 | 3/2007 | Adkins et al. |
| 2008/0141459 | A1 * | 6/2008 | Hamberg et al. ................. 5/600 |

OTHER PUBLICATIONS

All Hydraulic Fullsize Heavy Duty Trencher, http://www.barretomfg.com/fullsize-heavy-duty-trencher.php, 2 pages (Copyright 2007).

All Hydraulic Mini Heavy Duty Trencher, http://www.barretomfg.com/mini-heavy-duty-trencher.php, 1 page (Copyright 2007).

All new Barreto Track Trencher, http://www.barretomfg.com/tracker_trencher.php, 1 page (Copyright 2007).

Dingo® TX 420 and TX 425 Compact Utility Loader Operator's Manual, *The Toro Company*, pp. 1-47 (Copyright 2006).

Dingo® TX 525 Compact Utility Loader Operator's Manual, *The Toro Company*, pp. 1-53 (Copyright 2006).

Ditch Witch 1030/1230 Operator's Manual, *The Charles Machine Works, Inc.* pp. 1-70 (2004).

Introducing the New, Revolutionary Zero-Turning Radius Steerable Walk-Behind Trencher, http://www.barretomfg.com/steerable-trencher.php, 2 pages (Copyright 2007).

RT100, *Vermeer Manufacturing Company*, 4 pages (Copyright 2005).

RT200, *Vermeer Corporation*, 4 pages (Copyright 2008).

TRX-15 and TRX-19 Trencher Operator's Manual, *The Toro Company*, pp. 1-47 (Copyright 2008).

* cited by examiner

CONTROL SYSTEM FOR A WORK UNIT

CROSS-REFERENCE TO RELATED APPLICATION

This application claims the benefit of U.S. Provisional Patent Application Ser. No. 61/089,304, filed Aug. 15, 2008, which application is hereby incorporated by reference in its entirety.

TECHNICAL FIELD

The present disclosure relates generally to control systems for work units. More particularly, the present disclosure relates to control systems for walk-behind work units.

BACKGROUND

Work units such as walk-behind trenchers typically include a frame having a front end and a back end. A working element (e.g., a trenching boom, an excavating blade, or other type of attachment) is located at the front end of the frame and an operator station is located at the back end of the frame. A power source such as an internal combustion engine is mounted on the frame. The power source provides power to a drive arrangement such as a hydraulic drive. The hydraulic drive can drive components of the working element at the front of the frame, and can also drive propulsion elements (e.g., tires, tracks, or other traction structures suitable for propelling the working device over the ground) positioned at left and right sides of the frame.

Some prior art work units of the type described above are adapted to be manually steered. One example of a manually steered work unit is the RT 100 Walk-behind Trencher sold by Vermeer Manufacturing. This type of unit has elongated leveraging arms/handles that project rearwardly from the frame of the work unit. During use, the operator stands between the arms and uses the arms to manually steer the work unit. However, work units can often be quite heavy, awkward and difficult to maneuver. Therefore, the effectiveness of a manual steering system is often dependent on the size and strength of the operator.

Automatic steering systems for work units have also been developed (e.g., see U.S. Pat. No. 7,059,434). These types of steering systems can include a pivotal steering and propulsion control handle provided on a dash or control panel located at the rear of the work unit. While existing automatic steering systems are not dependent on the size and strength of the operator, they can have other shortcomings. For example, they may not allow the operator's hand to be positioned in a comfortable or ergonomic position during operation of the unit, or may also not be intuitive to use. Furthermore, such steering systems do not allow an operator to use both hands to grasp leveraging arms during forward or reverse movement of the work unit.

What is needed is a work unit with an improved control system such as an improved power steering system.

SUMMARY

Certain aspects of the disclosure relate to improved control systems for steering and/or otherwise operating a work unit.

Certain other aspects of the present disclosure relate to an improved control system for steering and otherwise operating a walk-behind outdoor unit.

Still other aspects of the present disclosure relate to a work unit including a frame having a front end and a back end. A working element is carried by the frame, and a pair of leveraging arms project outwards from the frame. The leveraging arms of the work unit are part of a power steering system that allow that an operator steer the work unit without letting go of the leveraging arms. In certain embodiments leftward or rightward pressure applied to at least one of the leveraging arms causes left and right propulsion elements of the work unit to be driven at differential speeds or in opposite directions so as to cause desired turning or pivoting of the work unit.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
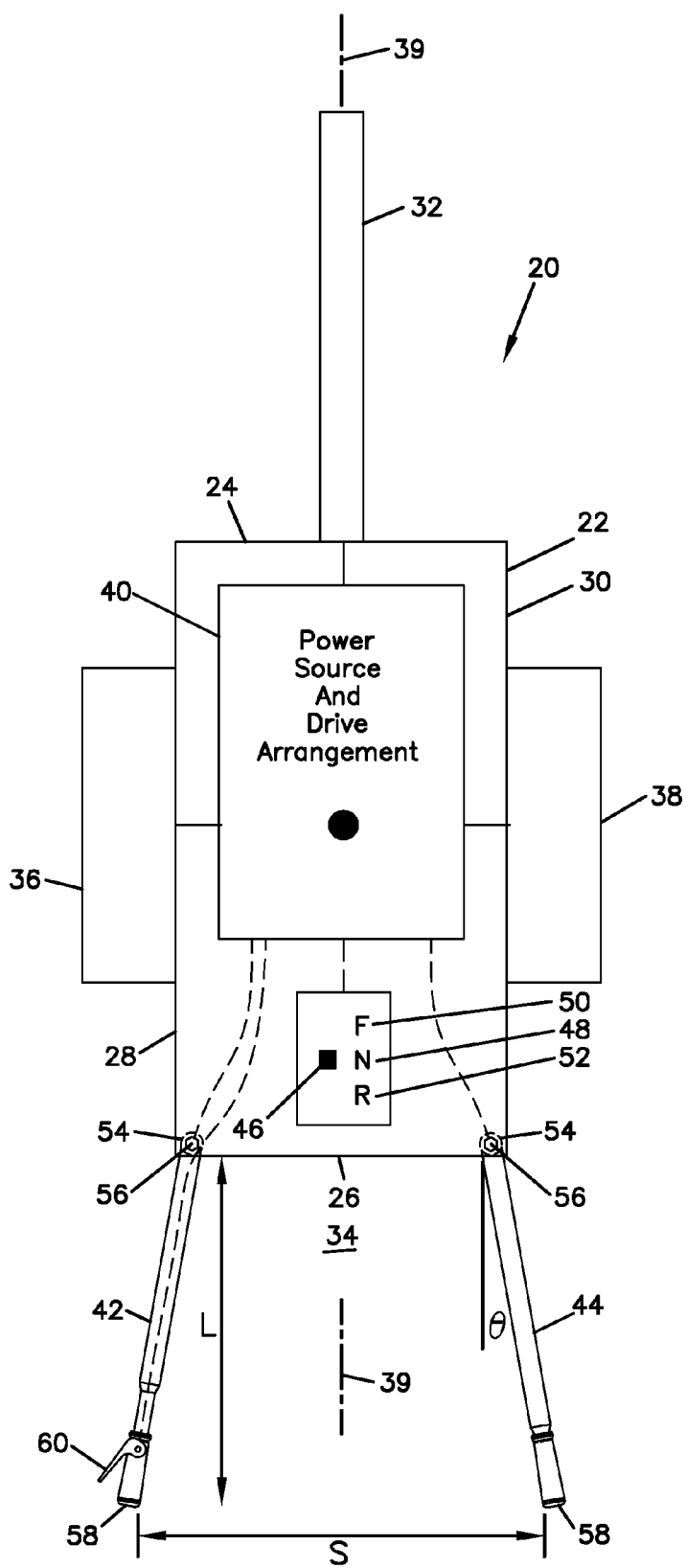
FIG. 1 schematically depicts a work unit having features that are examples of inventive aspects in accordance with the principles of the present disclosure.

FIGS. 1-9 illustrate an work unit 20 having features that are examples of inventive aspects in accordance with the principles of the present disclosure. The work unit 20 includes a frame 22 having a front end 24, a back end 26, a left side 28, and a right side 30. A work element 32 is provided at the front end 24 of the frame 22, and an operator station 34 is provided at the back end 26 of the frame 22. Left and right propulsion elements 36, 38 (e.g., wheels, chains, belts, continuous tracks, or other traction elements) are respectively provided at the left and right sides 28, 30 of the frame 22. The work unit 20 also includes a power source and drive arrangement 40 for driving the propulsion elements 36, 38 and, optionally, the work element 32. The work unit 20 further includes left and right leveraging arms 42, 44 for use in steering the work unit 20. For example, as described below, the leveraging arms 42, 44 are operatively coupled to the power source and drive arrangement 40 so that operator pressure applied to the leveraging arms 42, 44 provides power assisted steering of the work unit 20.

Referring still to FIG. 1, the work unit 20 also includes a propulsion control lever 46 that is movable between a neutral position 48, a forward position 50, and a reverse position 52. The propulsion control lever 46 preferably is retained in any of the forward, neutral, or reverse positions without requiring the operator to hold the lever in either the forward, neutral, or reverse positions. For example, the propulsion control lever 46 can be retained in the forward, neutral, and reverse positions by friction, detents, or other structure so that once an operator has positioned the propulsion control lever 46 in the desired position, the propulsion control lever 46 will remain in the desired position by itself, thereby allowing the operator to use both hands to grasp the left and right leveraging arms 42, 44. When an operator desires to change the position of the propulsion control lever 46, the operator lets go of at least one of the left and right leveraging arms 42, 44, and manually moves the propulsion control lever 46 to the desired position.

The leveraging arms 42, 44 have first ends 54 pivotally connected to the frame 22 of the work unit 20 at upright pivot axes 56. The leveraging arms 42, 44 also have second ends 58 rearwardly offset from the back end 26 of the frame 22. In certain embodiments the leveraging arms 42, 44 project rearwardly from the frame 22 a distance L (see FIG. 1) that is at least 12 inches, or in the range of 12-36 inches. The operator station 34 is positioned between the leveraging arms 42, 44 and is large enough to allow an operator to stand behind or walk behind the work unit 20. In one embodiment, a spacing S is defined between the second ends 58 of the leveraging arms 42, 44 with the spacing S being greater than 18 inches, or in the range of 18-36 inches.

Referring still to FIG. 1, the left and right leveraging arms 42, 44 are angled outwardly relative to a central axis 39 of the trencher. For example, when the leveraging arms 42, 44 are in a centered position, the leveraging arms 42, 44 are angled outwardly from the axis 39 by an angle $\theta$. In certain embodiments $\theta$ is about 10 degrees or in the range of 5-30 degrees. In other embodiments $\theta$ is greater than 5 degrees.

It will be appreciated that the work element 32 of the work unit 20 can include any number of different types of permanent structures or interchangeable attachments. For example, the work element 32 can include a trencher boom that supports a driven trencher chain. In other embodiments the work element 32 can include a rock wheel. In still other embodiments the work element 32 can include an excavating blade, such as a bulldozer blade, a grading blade, a plow blade, a vibratory plow, or a scraping blade. In still other embodiments the work element 32 can include a bulldozer bucket, a snowplow blade, augers for moving earth or snow, or other types of attachments/elements. In other embodiments, the work element can be mounted at the back of the frame or at an intermediate location of the frame. Depending upon the work element, the work unit may be operated in forward or reverse during use of the work element. For example, for a front mounted trencher boom, trenching is typically accomplished by operating the work unit in reverse with the trencher boom dragged behind the frame and the operator walking backward. For use of plows, augers, buckets and other work elements, the work unit is typically propelled in a forward direction or operated selectively in both forward and reverse directions.

The power source and drive arrangement 40 can include any number of different configurations suitable for driving the propulsion elements 36, 38 and, if needed, driving structures corresponding to the work element 32. For example, when the work element 32 constitutes a trencher, the power source and drive arrangement can be used to drive a trencher chain around a trencher boom. In certain embodiments, the power source and drive arrangement can include an engine such as an internal combustion engine that provides power to one or more hydraulic pumps, and hydraulic motors used to drive the propulsion elements 36, 38 and components of the work element 32. Of course, other drive arrangements could be used, such as direct drive arrangements, pneumatic arrangements, or other arrangements.

At least one of the leveraging arms 42, 44 can include an operator presence detector for insuring that an operator is located at the operator station 34 during operation of the work unit 20. In one embodiment a pivotal gripping handle 60 can be provided on one of the leveraging arms 42, 44. The gripping pivotal handle can be operatively connected to a cut-off switch that disables the power source and drive arrangement if the operator fails to grasp the handle when the propulsion control lever 46 is in either the forward or reverse position.

Figure 2:
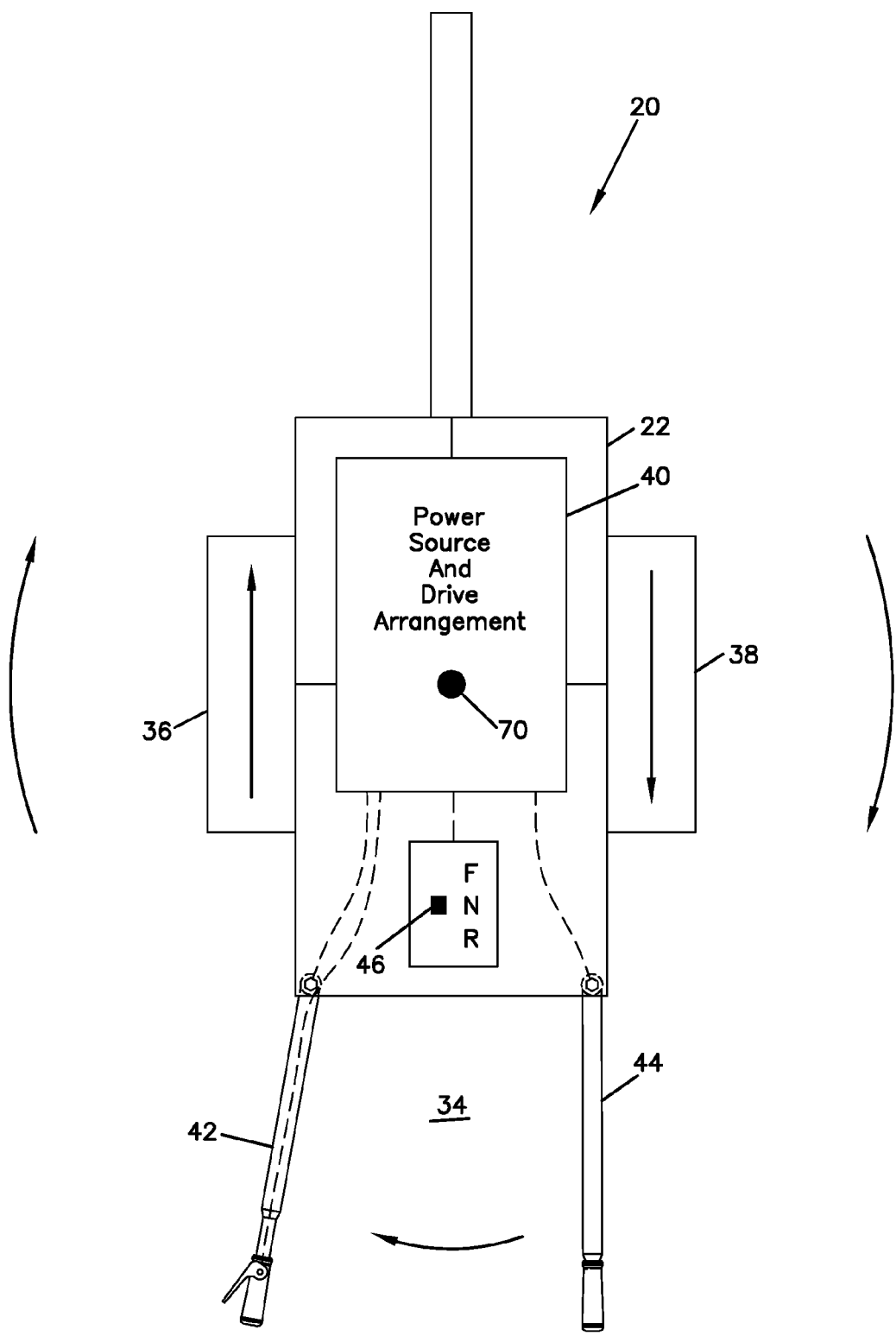
FIG. 2 shows the work unit of FIG. 1 with a drive arrangement of the work unit in neutral and the work unit being pivoted in a clockwise direction.
Figure 3:
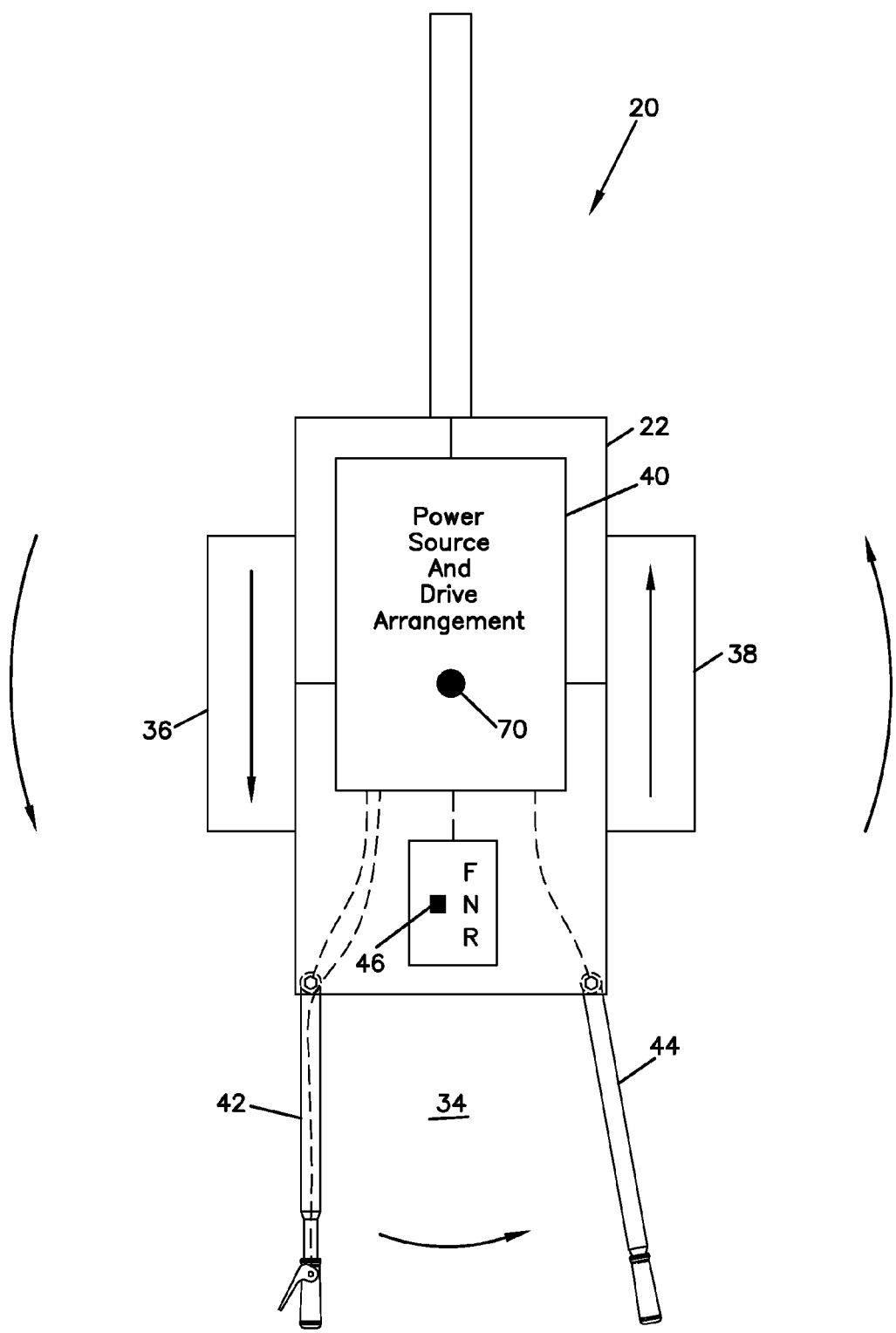
FIG. 3 shows the work unit of FIG. 1 with the drive arrangement in neutral and the work unit being pivoted in a counter-clockwise direction.
Figure 4:
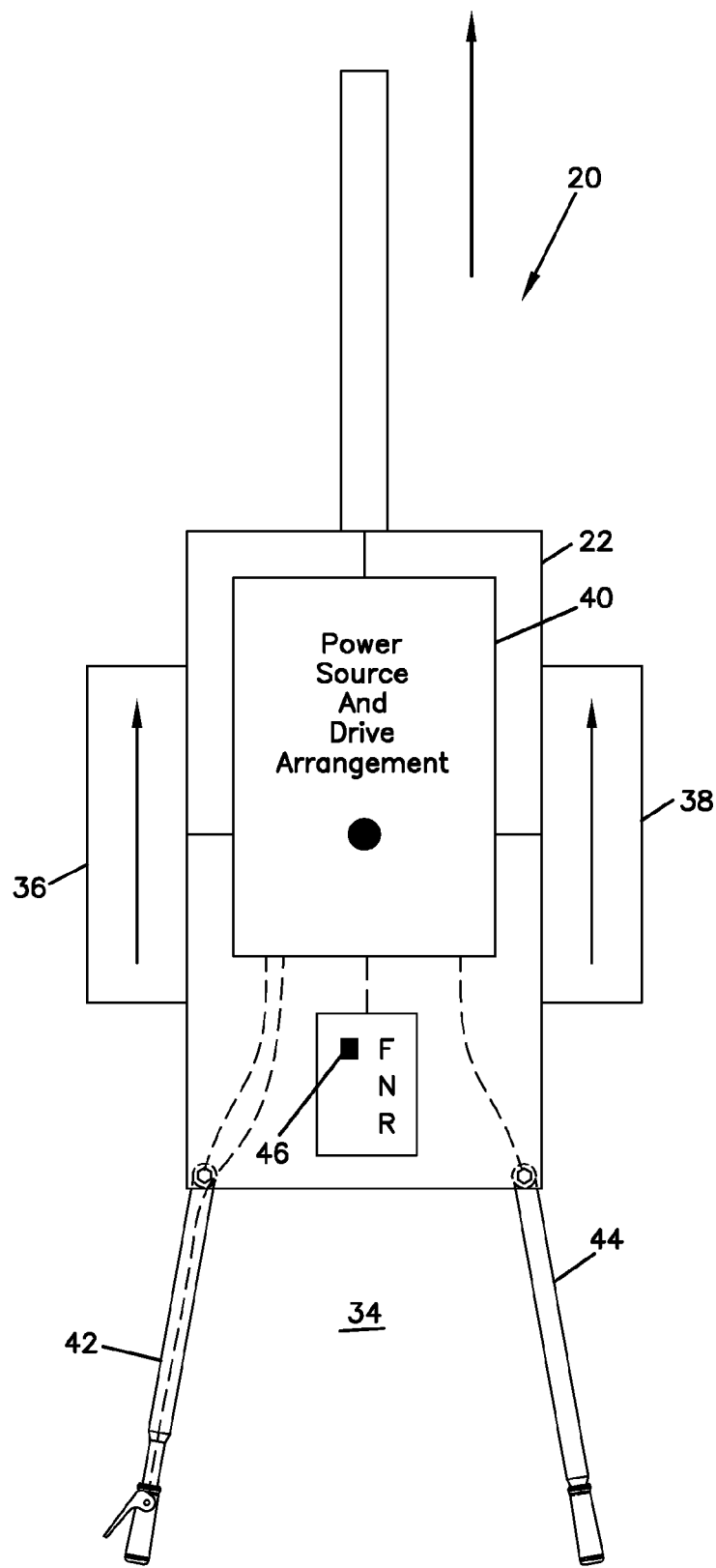
FIG. 4 shows the work unit of FIG. 1 with the drive arrangement shifted to forward and the work unit being propelled in a straight, forward direction.
Figure 5:
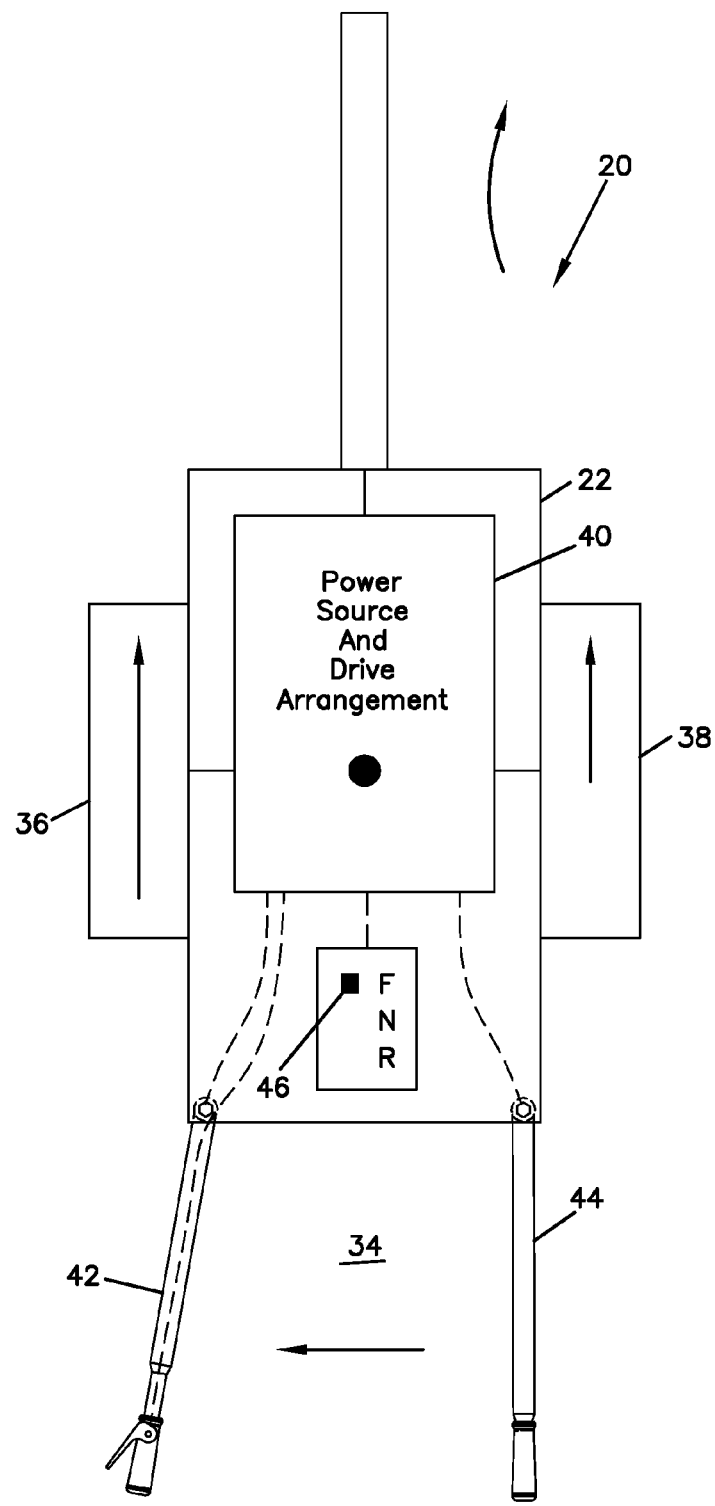
FIG. 5 illustrates the work unit of FIG. 1 with the drive arrangement shifted to forward and the work unit being turned in a right direction.
Figure 6:
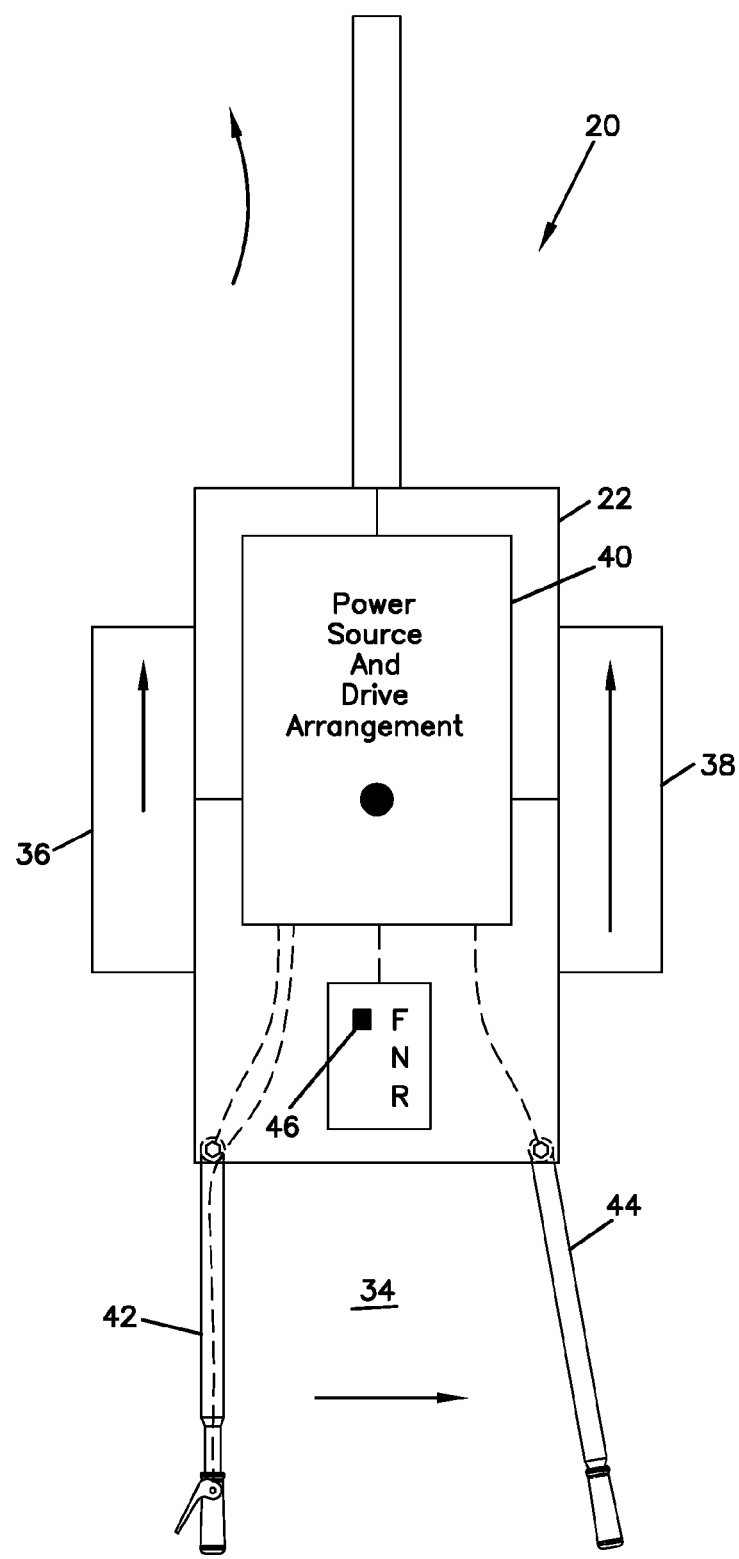
FIG. 6 illustrates the work unit of FIG. 1 with the drive arrangement shifted to forward and the work unit being turned in a left direction.
Figure 7:
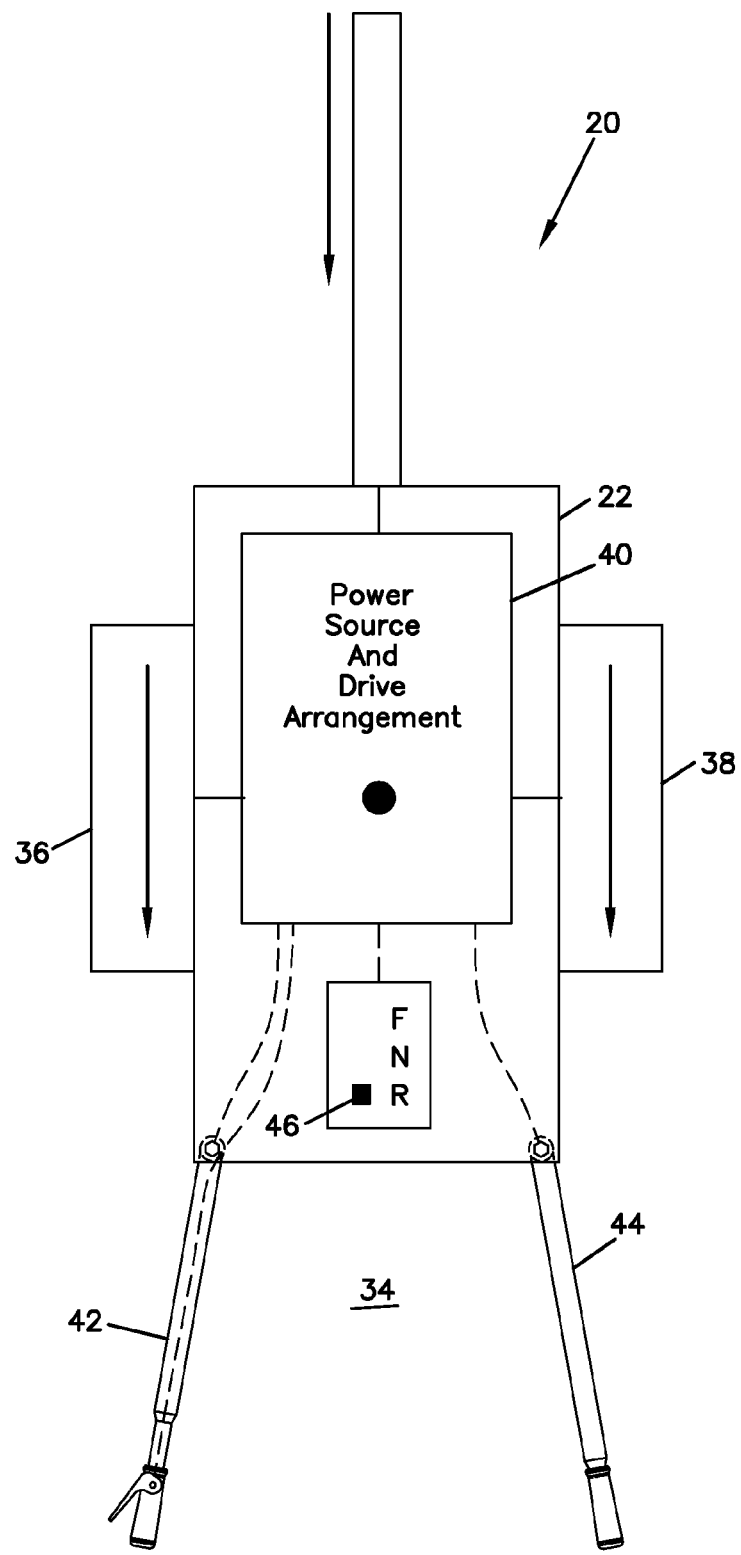
FIG. 7 illustrates the work unit of FIG. 1 with the drive arrangement shifted to reverse and the work unit being propelled straight backward.
Figure 8:
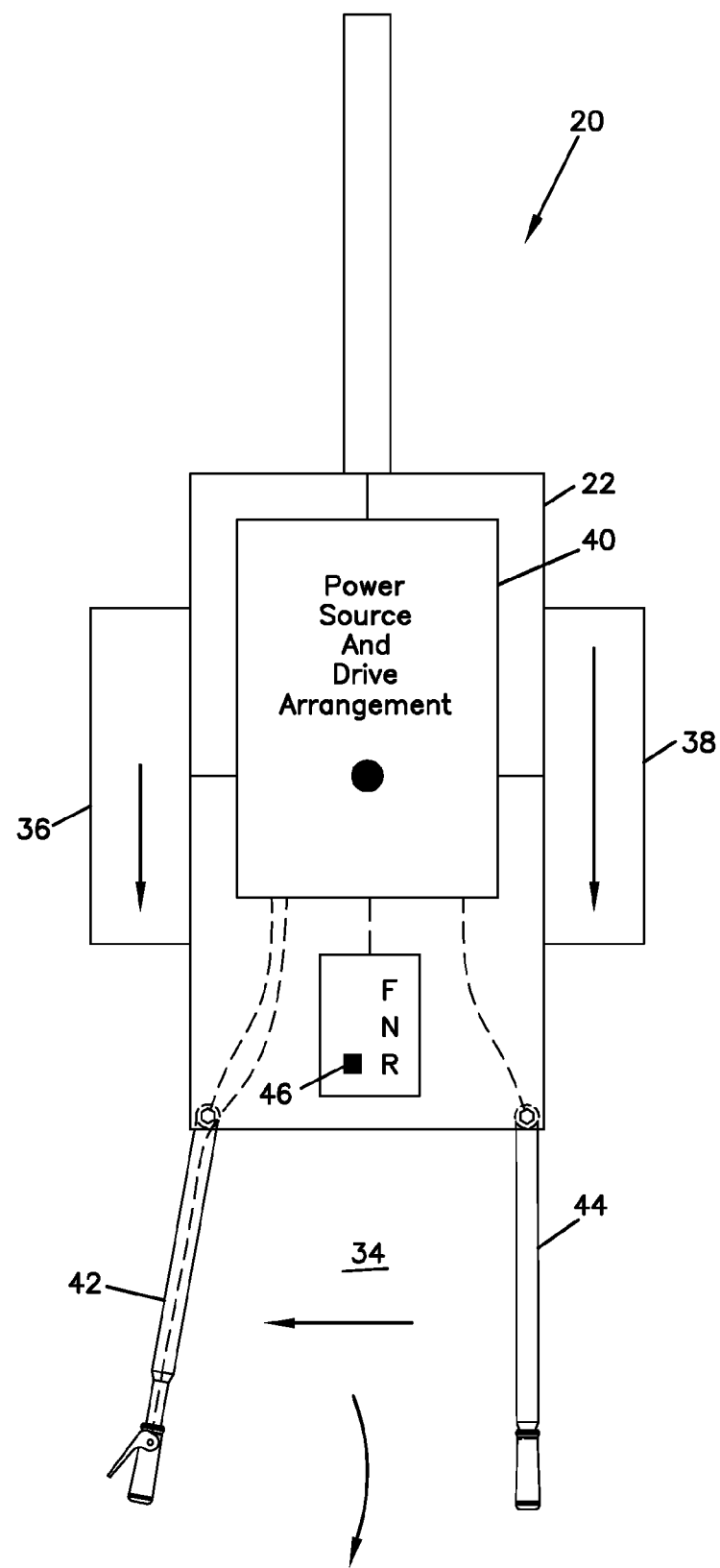
FIG. 8 illustrates the work unit of FIG. 1 with the drive arrangement shifted to reverse and the work unit being turned in a left, rearward direction.
Figure 9:
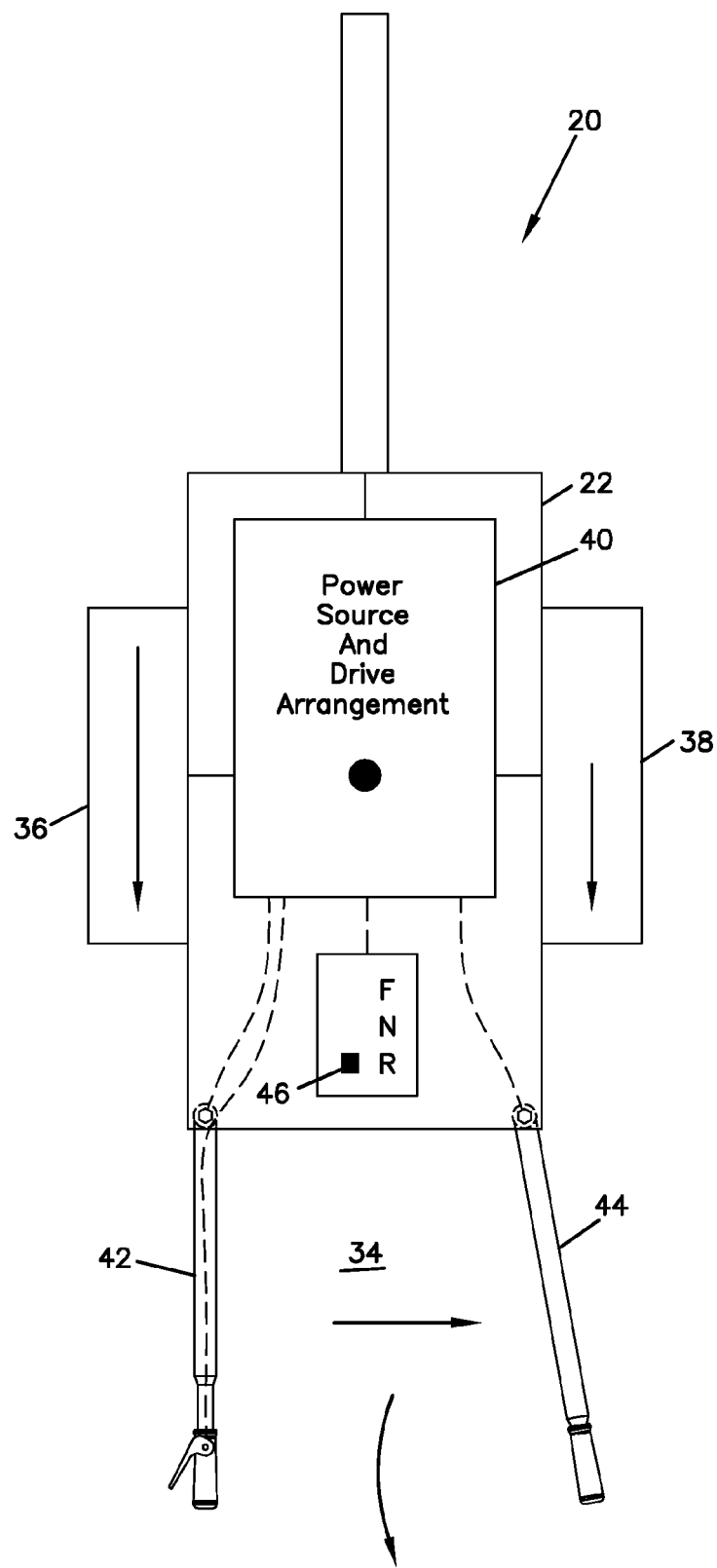
FIG. 9 illustrates the work unit of FIG. 1 with the drive arrangement shifted to reverse and the work unit being turned in a right, rearward direction.

The leveraging arms 42, 44 are preferably pivotally movable about their respective pivot axes 56, between a centered position (e.g., see FIGS. 1, 4, and 7), a clockwise turning position (e.g., a leftwardly pivoted position as shown at FIGS. 2, 5, and 8), and a counter-clockwise turning position (e.g., a rightwardly pivoted position as shown at FIGS. 3, 6, and 9). When the leveraging arms 42, 44 are in the centered position, the leveraging arms 42, 44 do not cause differential drive speeds between the left and right propulsion elements 36, 38. For example, when the propulsion control lever 46 is in the neutral position and the leveraging arms 42, 44 are in the centered position as shown at FIG. 1, the work unit 20 remains stationary. However, if it is desired to turn the work unit 20 in a clockwise zero turn radius, the operator moves the leveraging arms 42, 44 from the centered position to the position of FIG. 2. In the position of FIG. 2, the left and right propulsion elements 36, 38 are driven at the same speed, but in opposite directions. For example, the left propulsion element 36 is driven in a forward direction, while the right propulsion element 38 is driven in a rearward direction. This causes the work unit 20 to pivot in a clockwise direction about a pivot axis 70 of the work unit 20. To pivot the work unit 20 along a zero turning radius in a counter-clockwise direction, the leveraging arms 42, 44 are moved to the position of FIG. 3. With the leveraging arms 42, 44 in the position of FIG. 3, the arms 42, 44 cause the power source and drive arrangement to drive the left propulsion element 36 in a rearward direction, and the right propulsion element 38 in a forward direction. This causes the work unit 20 to rotate in a counter-clockwise direction about the pivot axis 70.

By positioning the leveraging arms 42, 44 in the centered position while the propulsion control lever 46 is in the forward position, the power source and drive arrangement 40 is caused to drive both propulsion elements 36, 38 at the same speed in a forward direction. This causes the work unit 20 to travel in a straight, forward direction as shown in FIG. 4. Pivoting the leveraging arms 42, 44 to the position of FIG. 5 while the propulsion control lever 46 remains in the forward position, causes the power source and drive arrangement 40 to drive the left and right propulsion elements 36, 38 at differential speeds. For example, as shown at FIG. 5, the left propulsion element 36 is driven forwardly at a faster speed than the right propulsion element is driven forwardly. This causes a power assisted right turn of the work unit 20 as the work unit moves forwardly. In contrast, by moving the leveraging arms 42, 44 to the position of FIG. 6 while the propulsion control lever 46 remains in the forward position, the power source and drive arrangement is caused to drive the right propulsion element 38 faster in the forward direction than the left propulsion element 36 is driven in the forward direction. This causes a power assisted left turn of the work unit 20 as the work unit 20 moves in forwardly.

FIG. 7 shows the work unit 20 with the propulsion control lever 46 in the reverse position, and the leveraging arms 42, 44 in the centered position. In this configuration, both of the propulsion elements 36, 38 are driven rearwardly at the same speed to cause the work unit to move in a straight, rearward direction. If the operator desires to turn the work unit 20 in a clockwise direction while continuing to move in a reverse direction, the leverage arms 42, 44 are pivoted to the leftward position shown at FIG. 8. When the leveraging arms 42, 44 are pivoted to the position of FIG. 8, the power source and drive arrangement is caused to drive the right propulsion element 38 faster in a rearward direction than the left propulsion element 36 is driven in a rearward direction. This causes a power assisted turn in a clockwise direction as the work unit 20 continues in reverse. If the operator wants to turn the work unit 20 in a counter-clockwise direction while the work unit 20 moves in reverse, the leveraging arms 42, 44 are pivoted to the rightward position shown at FIG. 9. In the position of FIG. 9, the leveraging arms 42, 44 cause the power source and drive arrangement 40 to drive the left propulsion element 36 rearwardly at a faster speed than the right propulsion element 38 is driven rearwardly. This causes a power assisted counter-clockwise turn as the work unit 20 continues to move in a reverse direction.

It will be appreciated that the sharpness of the turning radius can be directly dependent upon the positioning of the leveraging arms 42, 44. For example, by moving the leveraging arms 42, 44 only slightly leftward or slightly rightward from the centered position can cause more gradual turning than the sharp turns produced by pivoting the leveraging arms 42, 44 to the full leftward position (e.g., see FIGS. 2, 5, and 8) or the full rightward position (see FIGS. 3, 6, and 9).

As used herein, the term "drive" means to move. For example, in the case of a driven wheel, the wheel is driven by rotating the wheel about the wheel axle. In the case of a structure such as a continuous track or belt, the track or belt are rotated in a continuous loop when driven by the power source and drive arrangement.

It is preferred for the leveraging arms 42, 44 to be operatively coupled to the power source and drive arrangement 40. By "operatively coupled" it is meant that the leveraging arms 42, 44 can be used to provide an input for controlling operation of the power source and/or the drive arrangement. For example, the levering arms 42, 44 can be connected to the power source and/or the drive arrangement by a mechanical linkage such that movement of the leveraging arms 42, 44 varies the operation of the power source and/or the drive arrangement. In one embodiment mechanical linkage can extend from the leveraging arms 42, 44 to hydraulic pumps corresponding to the drive arrangement such that movement of the leveraging arms 42, 44 about the pivot axes 56 manipulates the linkages thereby causing variations in the displacements of the hydraulic pumps to alter the speed or direction that the propulsion elements 36, 38 are driven.

In other embodiments the leveraging arms 42, 44 can be operatively coupled to the power source and/or the drive arrangement through an operative coupling such as an electrical coupling or a wireless coupling. For example, position sensors can be provided at one or both of the leveraging arms 42, 44 to sense the position of the arms 42, 44. The position sensor can send a signal (e.g., a wireless signal, an electrical signal, fiber optic signal, or any other type of signal) to a controller that interfaces with the power source and/or the drive arrangement. Based on the sensed position of the leveraging arms 42, 44, the controller can cause the power source and drive arrangement to provide the pivoting or turning response desired by the operator.

Using the leveraging arms 42, 44 to control power assisted turning of the work unit 20 provides numerous advantages. For example, because turning is power assisted, operation of the work unit is not dependent upon the size or strength of the operator. Additionally, the configuration allows an operator to steer with his or her hands in a better ergonomic position while still allowing the operator to assist in the operation of the machine by lifting or depressing the leveraging arms. For example, the leveraging arms can be used in situations where the machine may need to be assisted out of structures such as a trench, or can be used to help with applying a downward force on a trenching plunge cut or when initially getting a blade started in hard ground. Moreover, power assisted steering with the leveraging arms 42, 44 is intuitive and safe. Because the operator is positioned between the leveraging arms 42, 44, over-rotation of the work unit 20 is prevented during steering. For example, if the work unit 20 begins to rotate faster than the operator moves, one of the leveraging arms 42, 44 will engage the operator, thereby causing the leveraging arms 42, 44 to move back toward the centered position, thereby slowing down and/or stopping rotation of the work unit 20.

Figure 10:
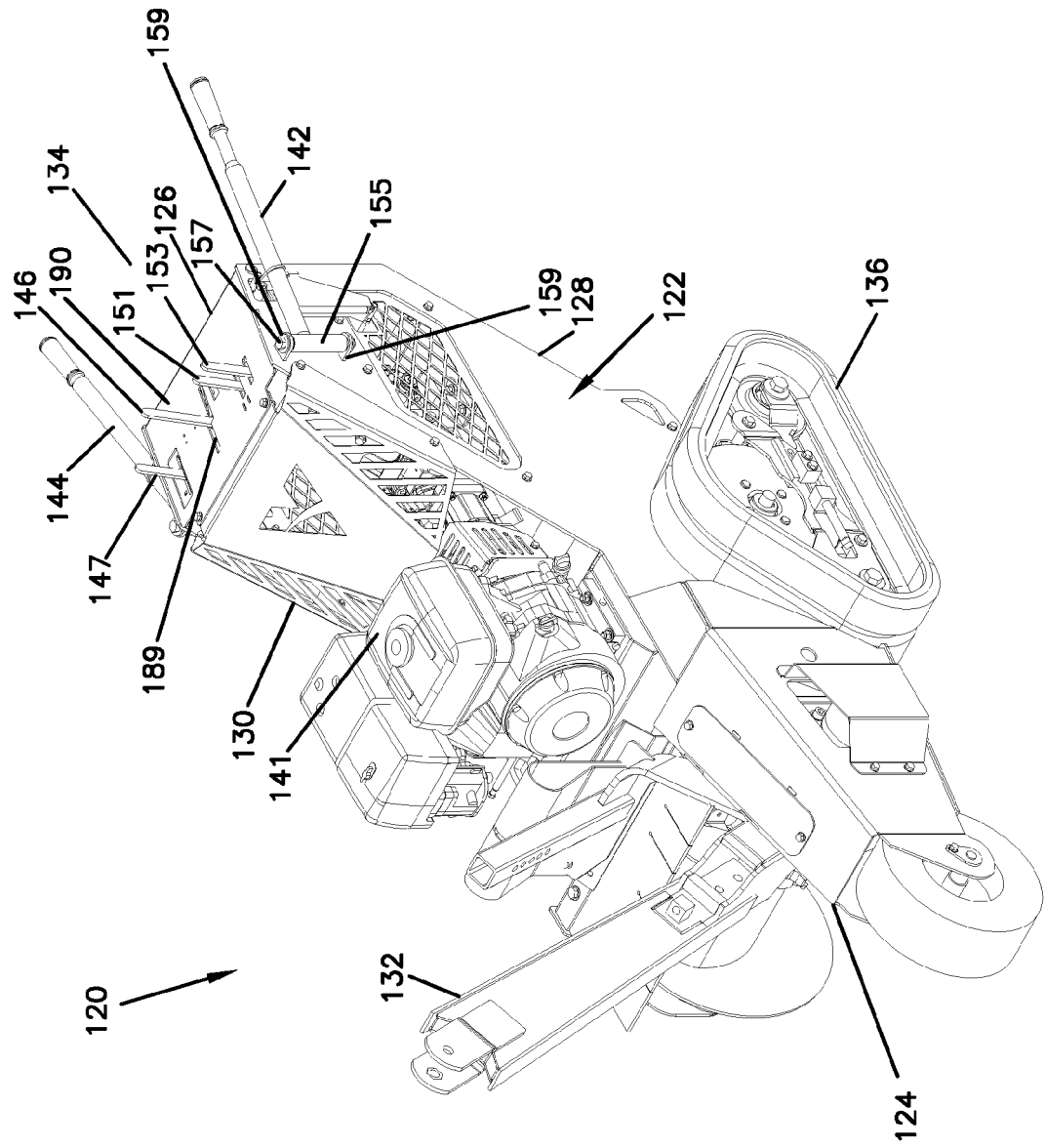
FIG. 10 is a perspective view of a walk-behind trencher having features that are examples of inventive aspects in accordance with the principles of the present disclosure.
Figure 11:
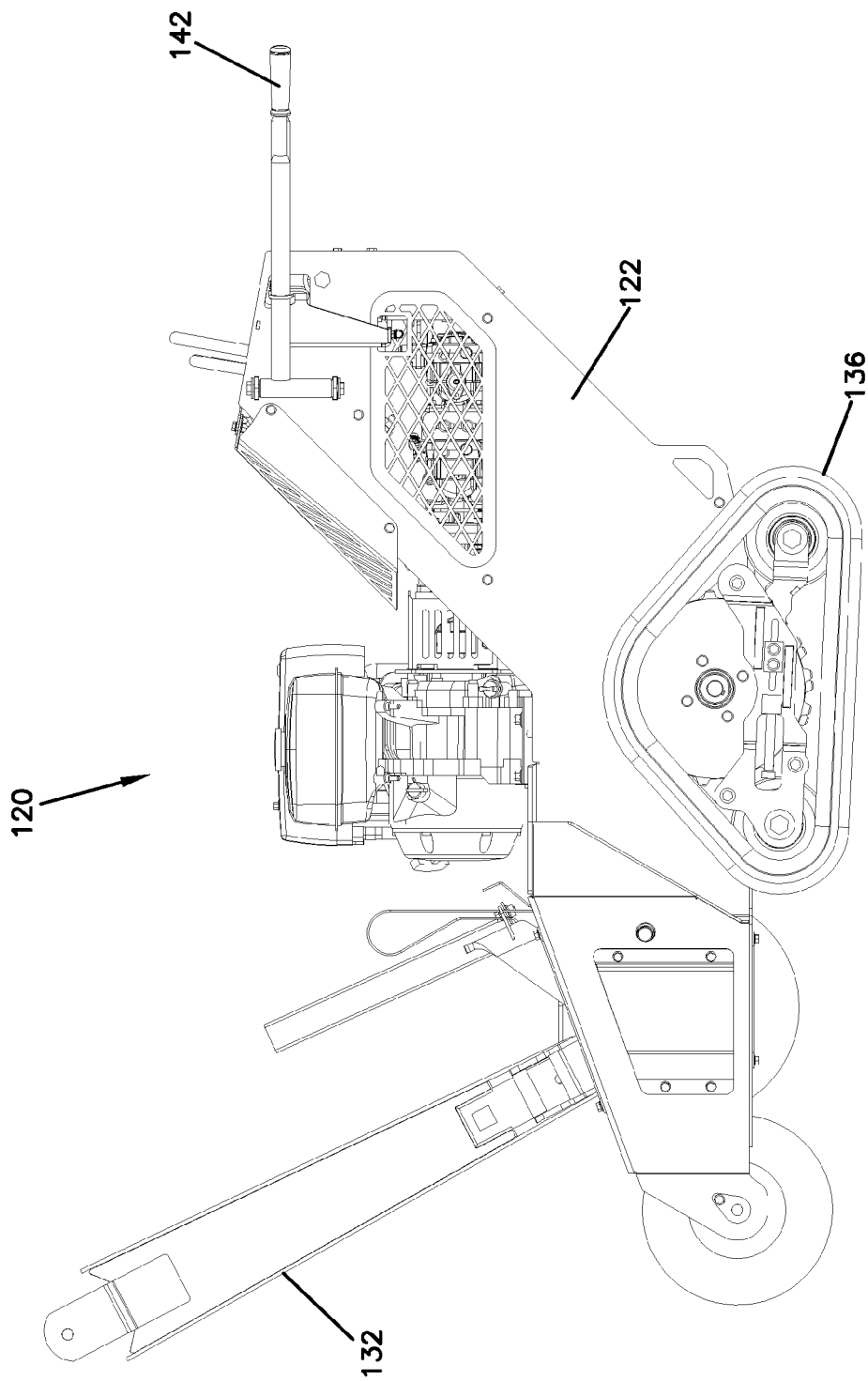
FIG. 11 is a side view of the trencher of FIG. 10.

FIGS. 10-15 show a trencher 120 having features that are examples of inventive aspects in accordance with the principles of the present disclosure. The trencher 120 includes a frame 122 having a front end 124 positioned opposite from a back end 126. The frame 122 also includes a left side 128 positioned opposite from a right side 130. A trencher boom 132 is positioned at the front end 124 of the frame 122, and an operator station 134 is positioned at the back end 126 of the frame 122. Left and right continuous tracks 136, 138 are mounted to the frame 122 for propelling the work unit 20. The tracks 136, 138 are driven by a power source and drive arrangement including an internal combustion engine 141 that provides power to a pair of hydraulic pumps 180, 181 (see FIG. 16) used to provide hydraulic fluid pressure to hydraulic motors 183, 184 (see FIG. 16) that respectfully drive the tracks 138, 136. The internal combustion engine 141 can also provide power to another hydraulic pump that provides hydraulic fluid pressure to a hydraulic motor used to drive a chain that mounts on the trencher boom 132. As shown in FIG. 10, the engine 141 is mounted on the frame 22 at a location between the front end 24 and the back end 26.

Referring to FIG. 10, the trencher 120 includes a control panel 190 located immediately in front of the operator station 34. A propulsion control lever 146 is mounted at the control panel 190. The propulsion control lever 146 is preferably movable between a neutral position, a forward position, and a reverse position. Similar to the previously described propulsion control lever, the propulsion control lever 146 preferably stays at the forward, neutral, or reverse positions without operator assistance (e.g., via friction). Additional levers are also provided at the control panel 190. For example, a throttle lever 147 is used to control the speed of the engine 141, and control levers 151 and 153 control operation of the trencher (e.g., one lever plunges and raises the trencher boom 132, while the other lever controls the trencher chain speed).

Referring still to FIGS. 10-15, left and right leveraging arms 142, 144 are mounted at the back end 126 of the frame 122. First ends of the leveraging arms 142, 144 include pivot sleeves 155 that pivot about pivot pins 157. The pivot pints 157 are mounted to ears 159 that project outwardly from the left and right sides of the frame 122. The pivot sleeves 155 pivotally mount over the pivot pins 157 and are captured between the ears 159.

Figure 15:
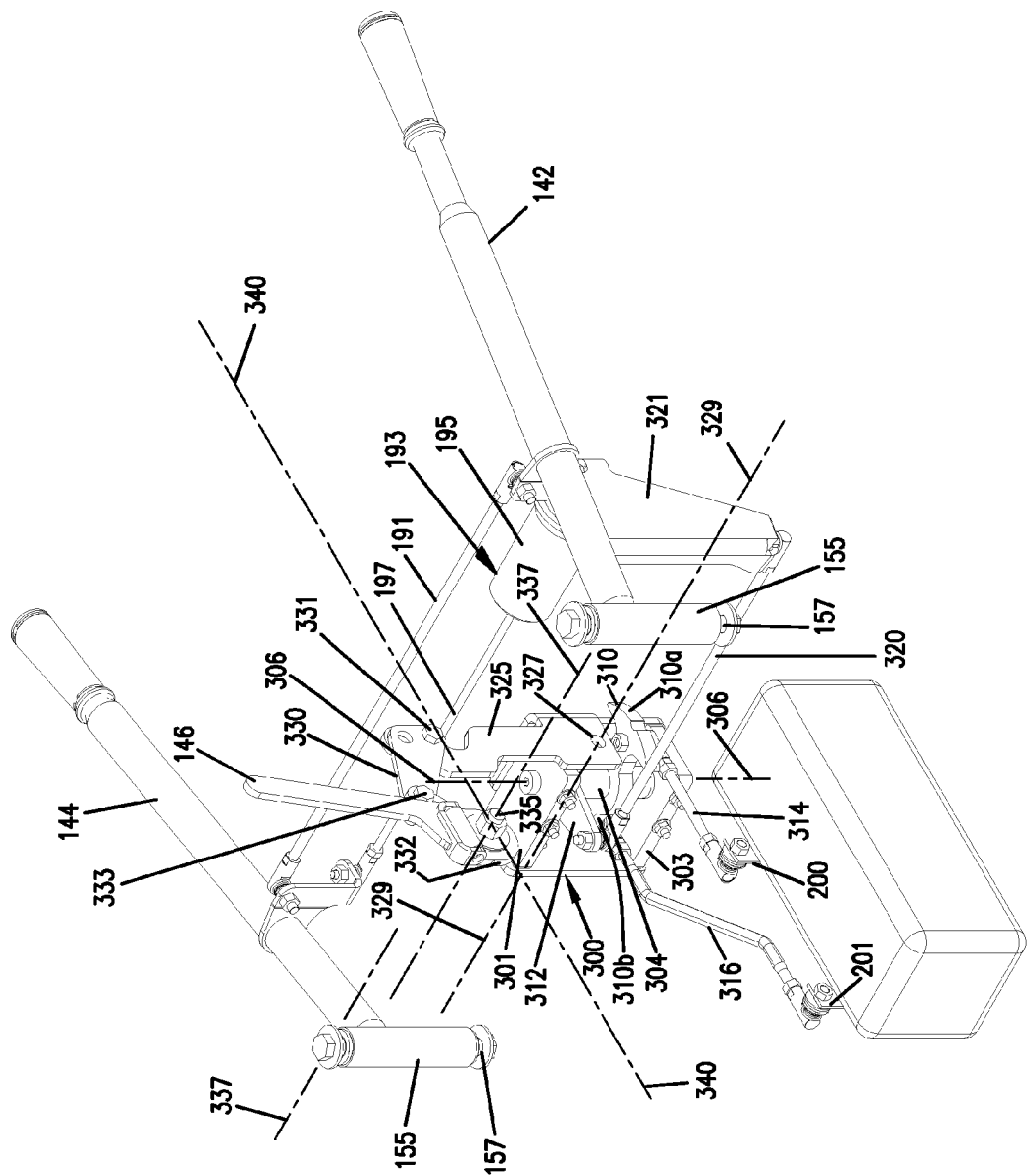
FIG. 15 is a perspective view of a steering control system of the trencher of FIG. 10, leveraging arms of the steering control system are shown in a centered position and a propulsion control lever of the system is shown in a neutral position.
Figure 16:
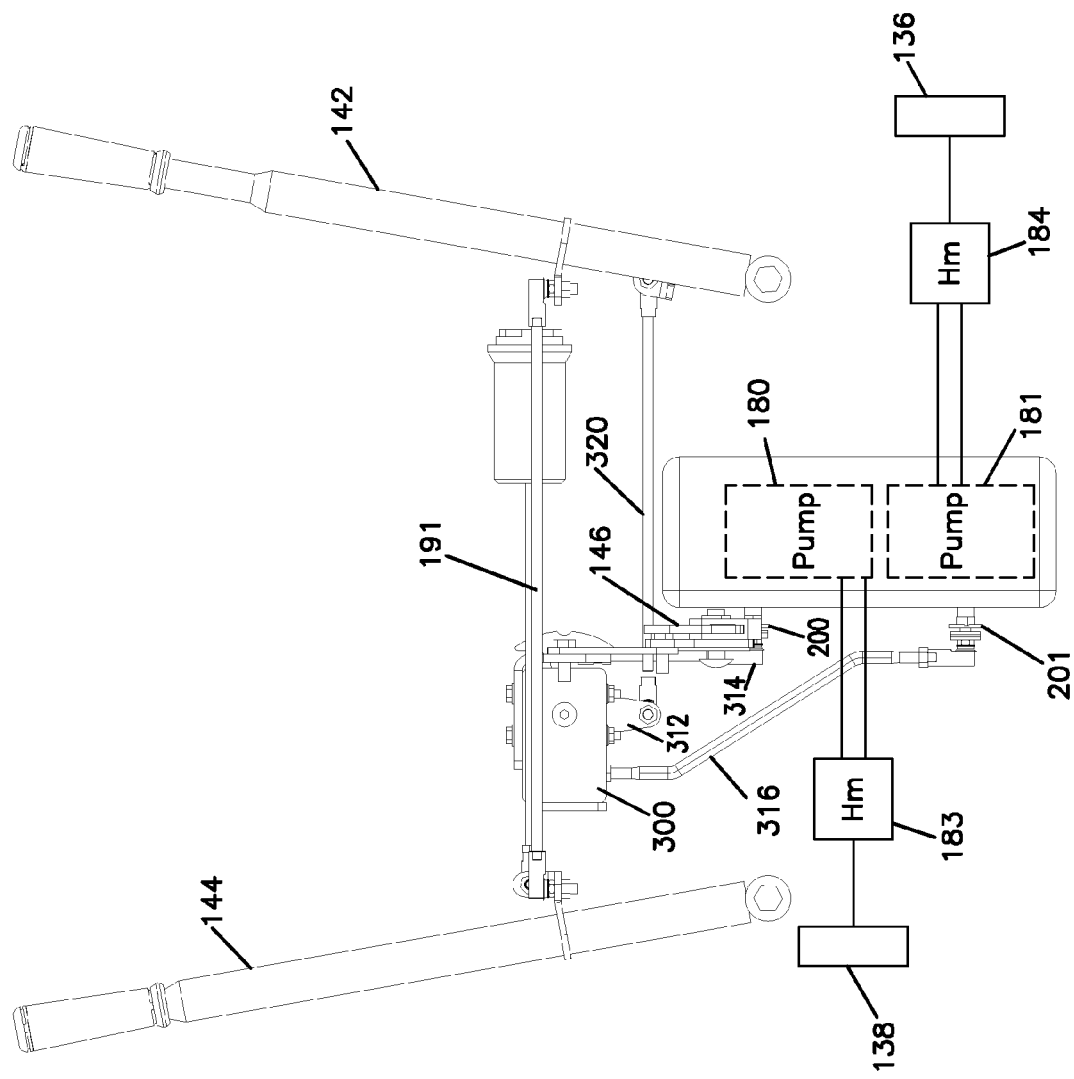
FIG. 16 is a top view of the steering control system of FIG. 15 with the leveraging arms centered and the propulsion control lever in the neutral position.
Figure 17:
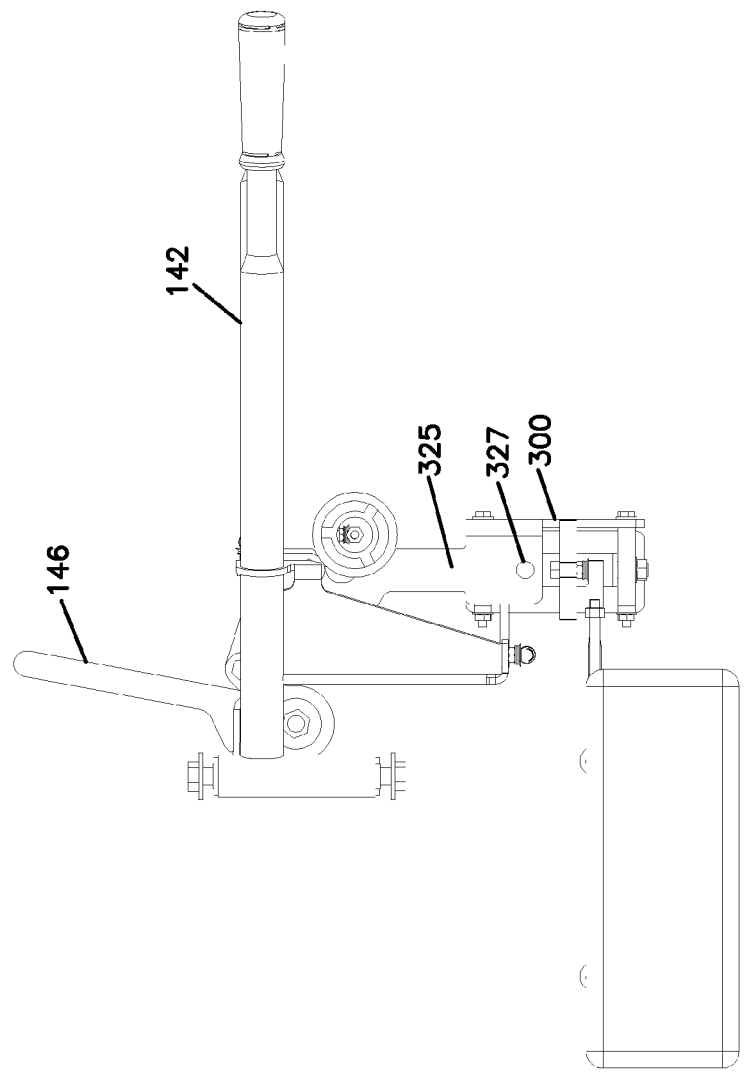
FIG. 17 is a left side view of the steering control system of FIG. 15 with the leveraging arms centered and the propulsion control lever in the neutral position.
Figure 18:
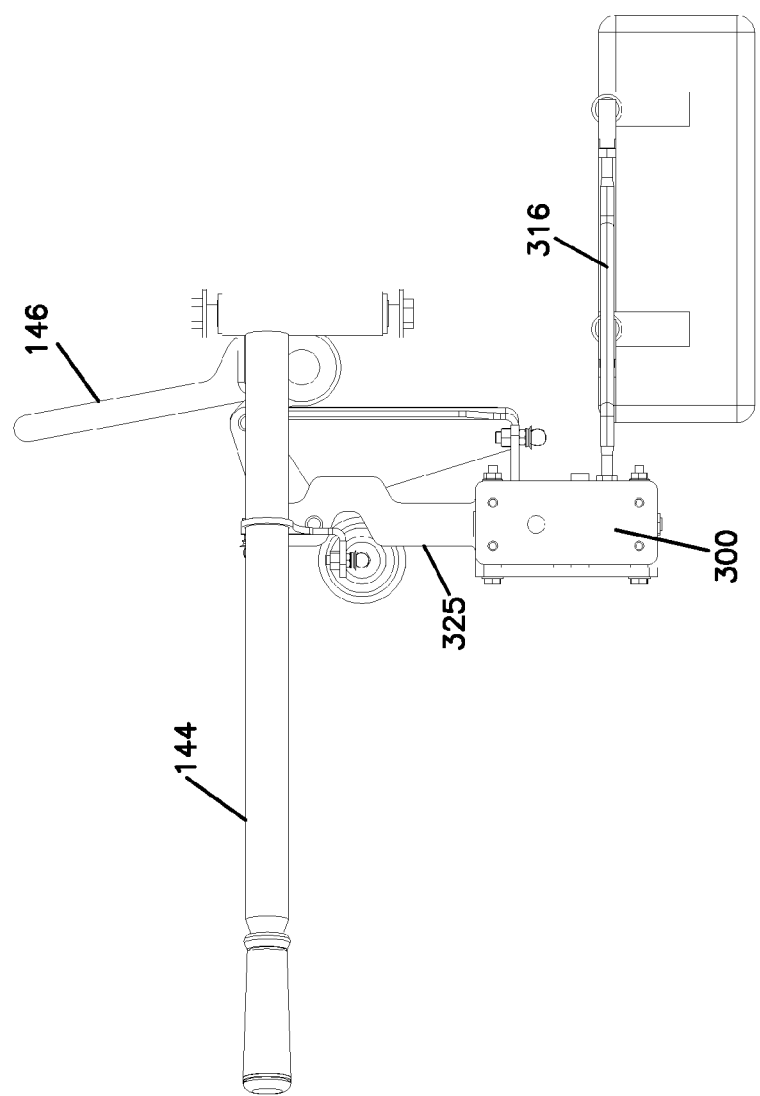
FIG. 18 is a right side view of the steering control system of FIG. 15 with the leveraging arms centered and the propulsion control lever in the neutral position.
Figure 19:
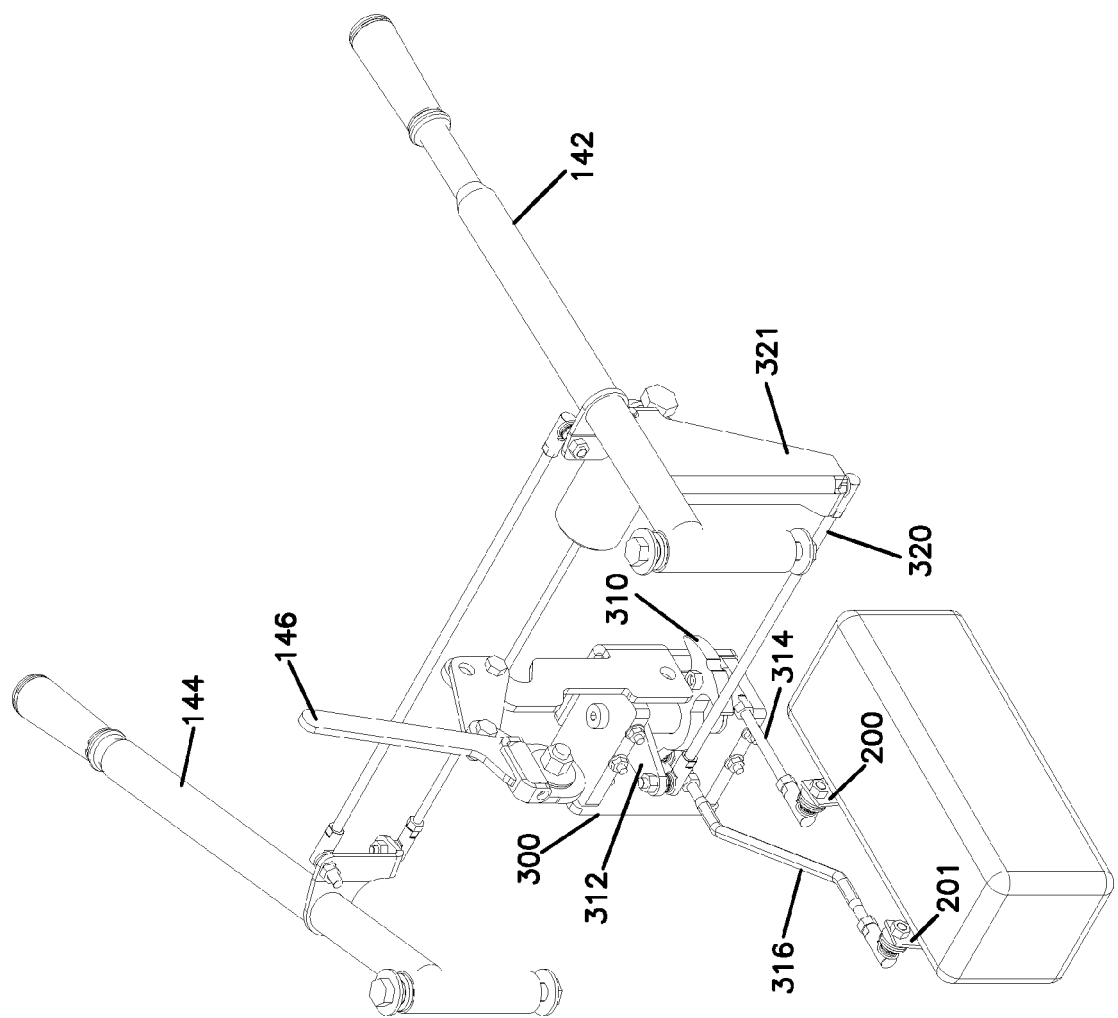
FIG. 19 shows the steering control system of FIG. 15 with the leveraging arms pivoted rightward and the propulsion control lever in the neutral position.
Figure 20:
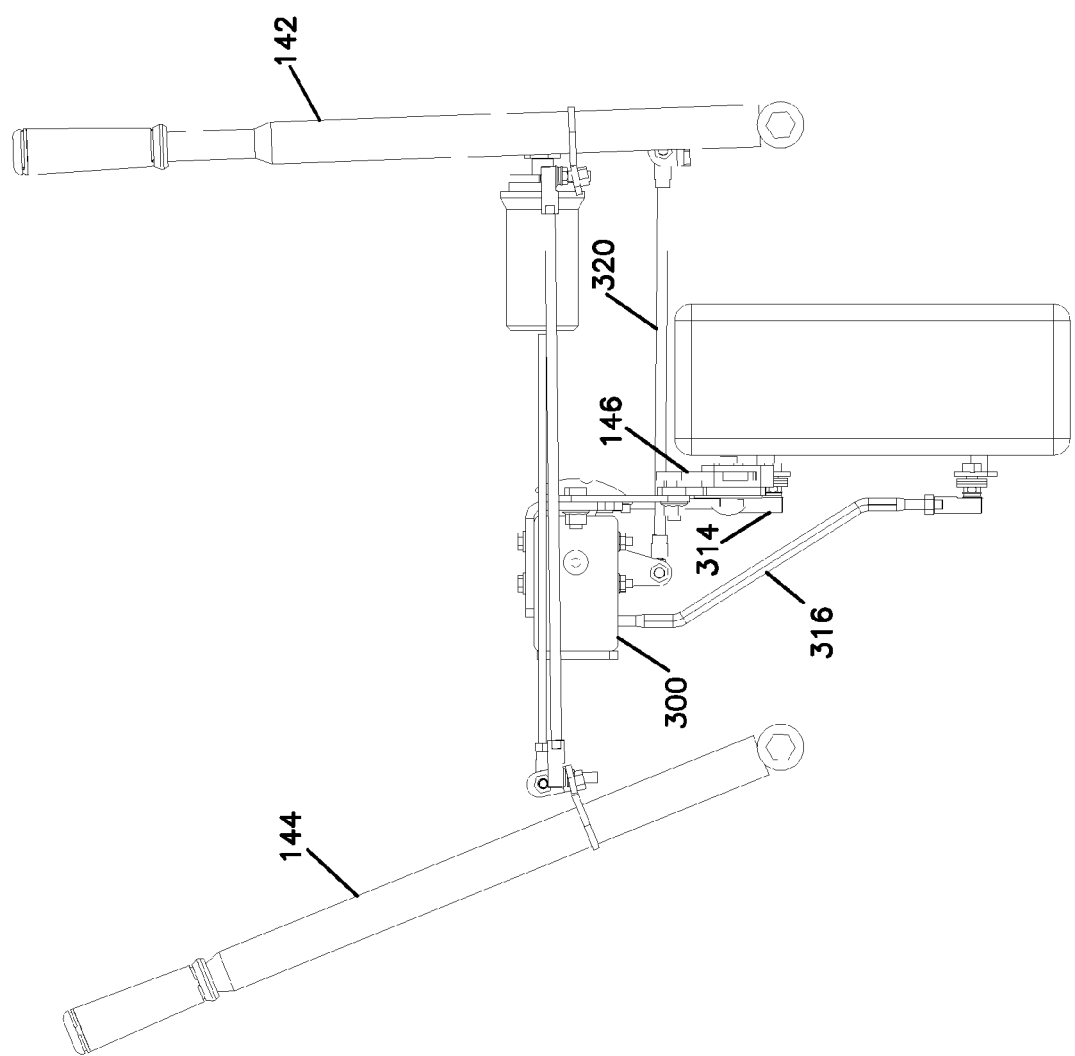
FIG. 20 is a top view of the steering control system of FIG. 15 with the leveraging arms pivoted rightward and the propulsion control lever in the neutral position.
Figure 21:
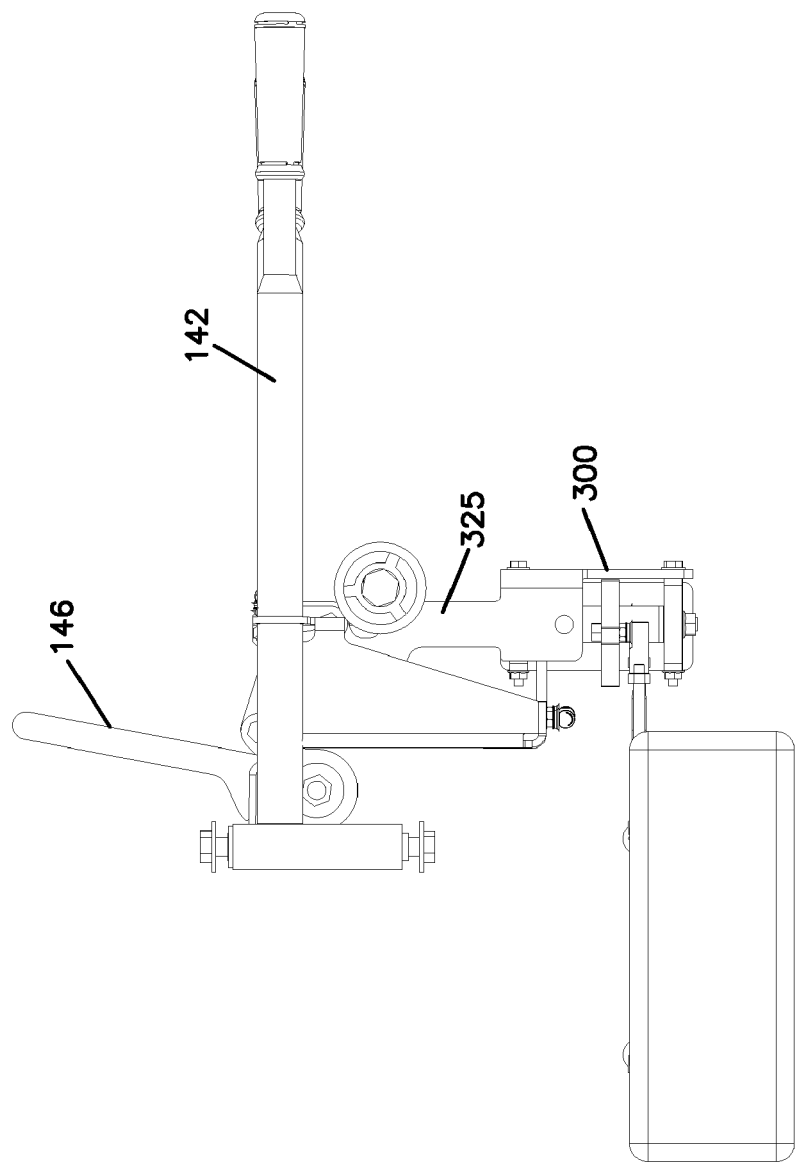
FIG. 21 is a left side view of the steering control system of FIG. 15 with the leveraging arms pivoted rightward and the propulsion control lever in the neutral position.
Figure 22:
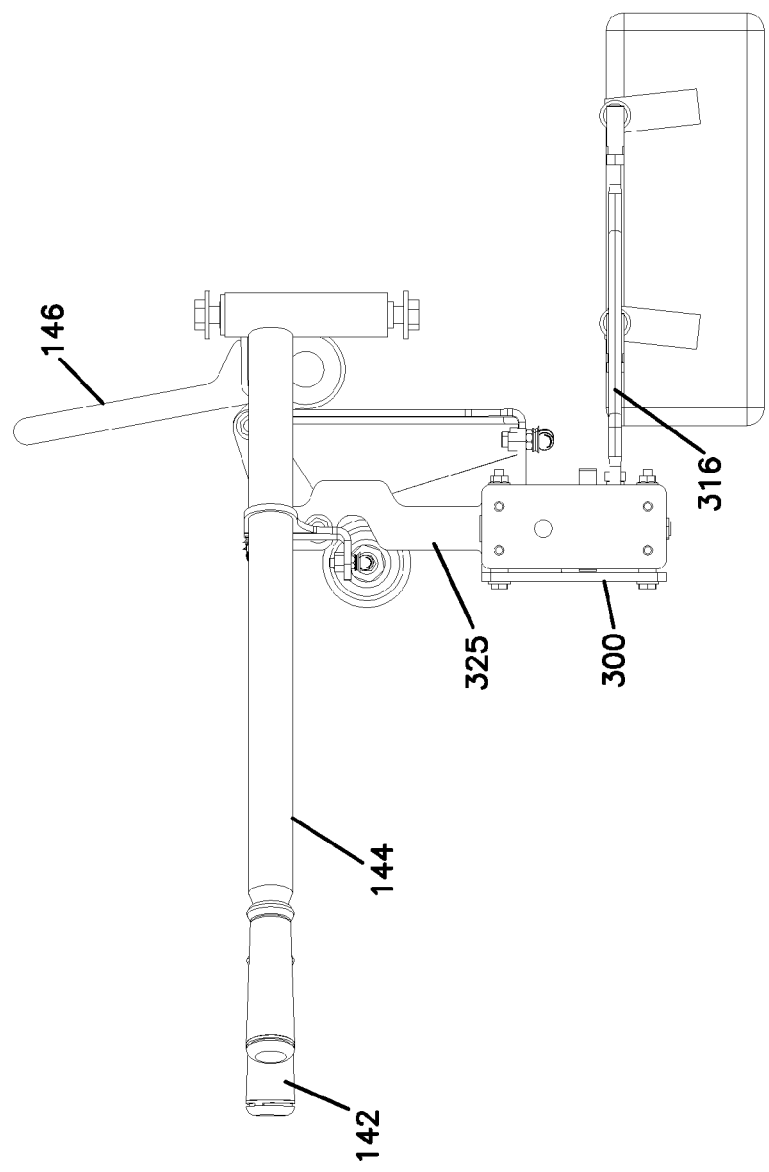
FIG. 22 is a right side view of the steering control system of FIG. 15 with the leveraging arms pivoted rightward and the propulsion control lever in the neutral position.

As shown at FIG. 15, the left and right leveraging arms 142, 144 are linked together by a tie rod 191 that maintains a uniform spacing between the leveraging arms 142, 144. The leveraging arms 142, 144 are also biased toward a centered position by a centering spring arrangement 193. The centering spring arrangement 193 includes a spring housing 195 secured to the frame 122 of the trencher 120. The spring arrangement 193 also includes a piston rod 197 that slides reciprocally within the spring housing 195. The piston rod 197 has a free end coupled to the right leveraging arm 144. As indicated above, the spring arrangement 193 biases the leveraging arms 142, 144 toward the centered position. For example, if the leveraging arms are pivoted relative to the frame 122 to a leftward position, the spring arrangement 193 will automatically return the leveraging arms 142, 144 to the centered position upon release of the arms 142, 144. Similarly, if the leveraging arms 142, 144 are pivoted relative to the frame 122 to a rightward position, the spring arrangement 193 will automatically return the leveraging arms 142, 144 to the centered position upon release of the arms 142, 144. With the leveraging arms 142, 144 in the centered position, the trencher 120 will be propelled in a straight direction when the propulsion control lever 146 is shifted from neutral to either the forward or reverse position.

Referring to FIGS. 15-19, the propulsion control lever 146 and the left and right leveraging arms 142, 144 are operatively connected to the hydraulic pumps 180, 181 by a mechanical linkage arrangement including a plurality of mechanical linkages. In the depicted embodiment of FIG. 15, the mechanical linkage arrangement mechanically couples the propulsion control lever 146 and the leveraging arms 142, 144 to control members 200, 201 that respectively control the pump displacement (e.g., the swash plate positions) of pumps 180, 181 (see FIG. 16). As described previously, the pumps 180, 182 provide hydraulic fluid flow to hydraulic motors 183, 184 used to drive the tracks 138, 136.

Figure 23:
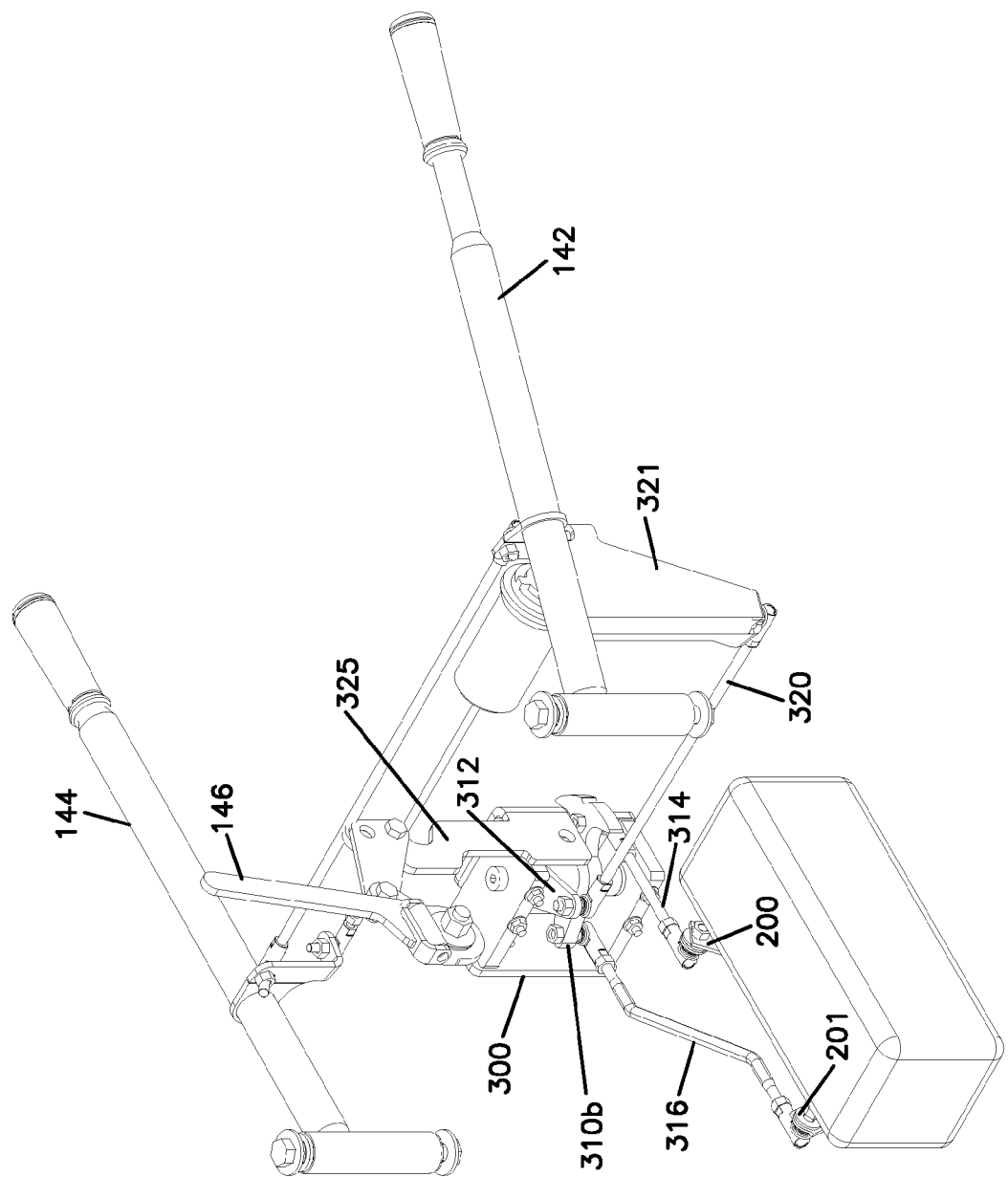
FIG. 23 shows the steering control system of FIG. 15 with the leveraging arms pivoted leftward and the propulsion control lever in the neutral position.
Figure 24:
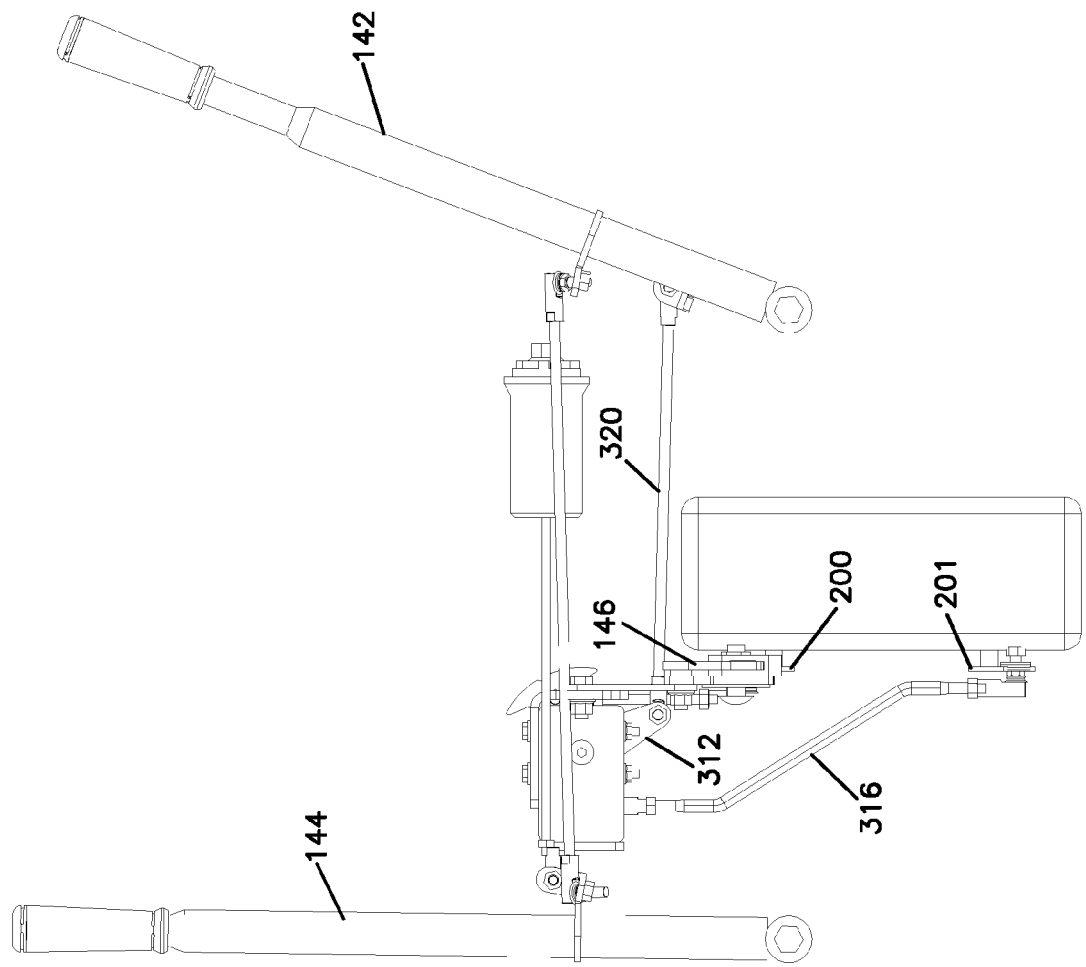
FIG. 24 is a top view of the steering control system in the configuration of FIG. 15 with the leveraging arms pivoted leftward and the propulsion control lever in the neutral position.
Figure 25:
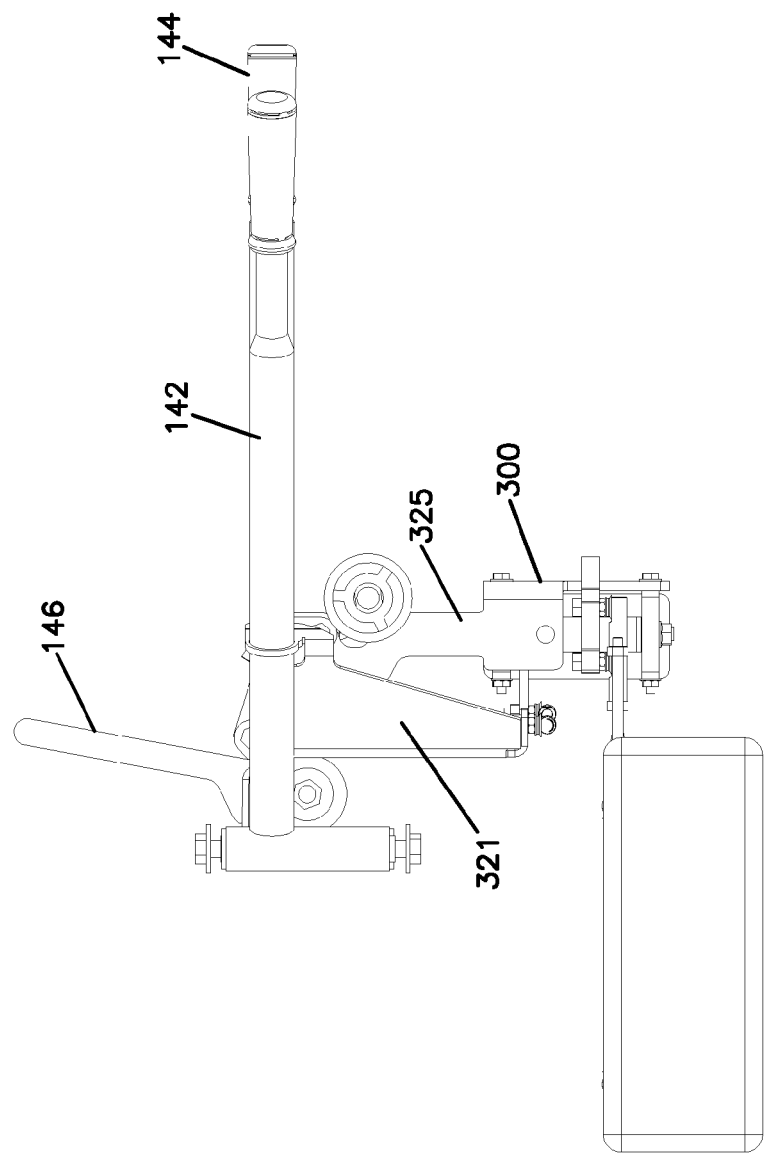
FIG. 25 is a left side view of the steering control system in the configuration of FIG. 15 with the leveraging arms pivoted leftward and the propulsion control lever in the neutral position.
Figure 26:
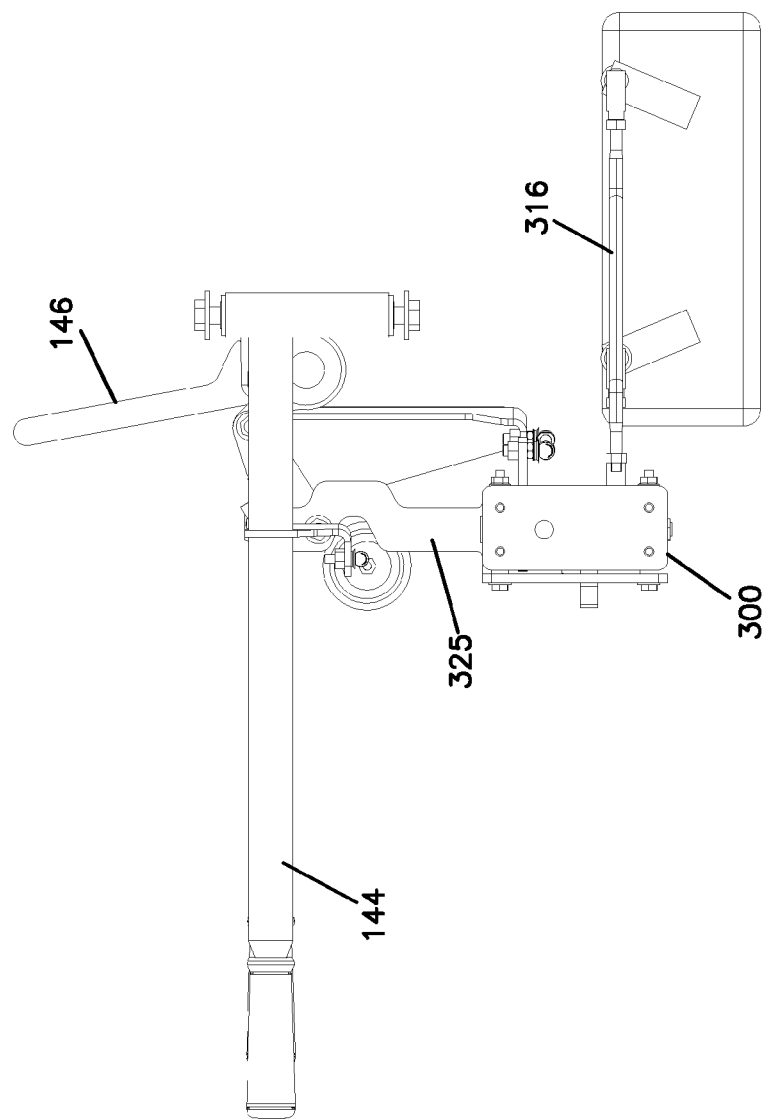
FIG. 26 is a right side view of the steering control system in the configuration of FIG. 15 with the leveraging arms pivoted leftward and the propulsion control lever in the neutral position.
Figure 27:
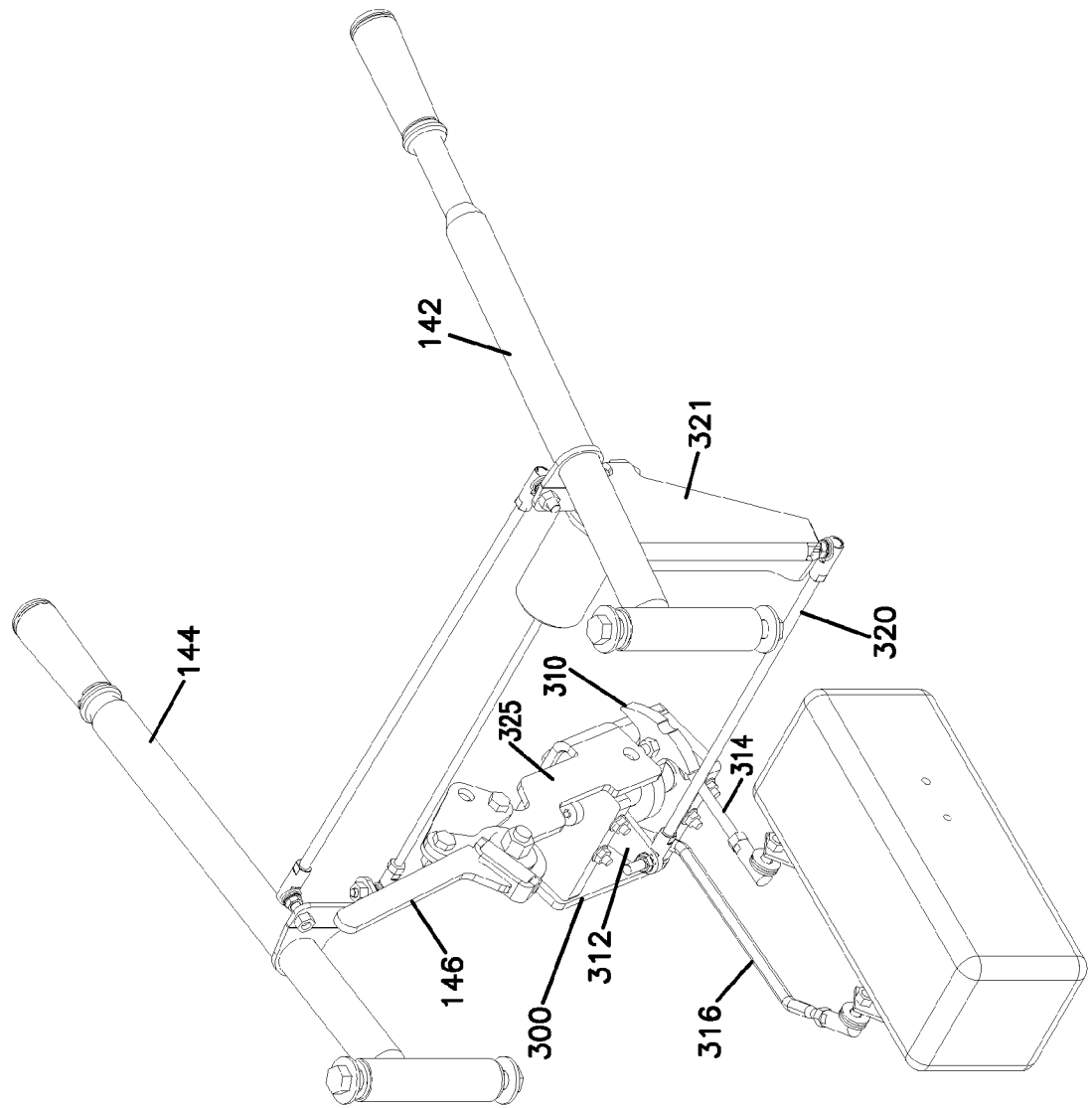
FIG. 27 shows the steering control system of FIG. 15 with the propulsion control handle moved to a forward position and the leveraging arms in the centered position.
Figure 28:
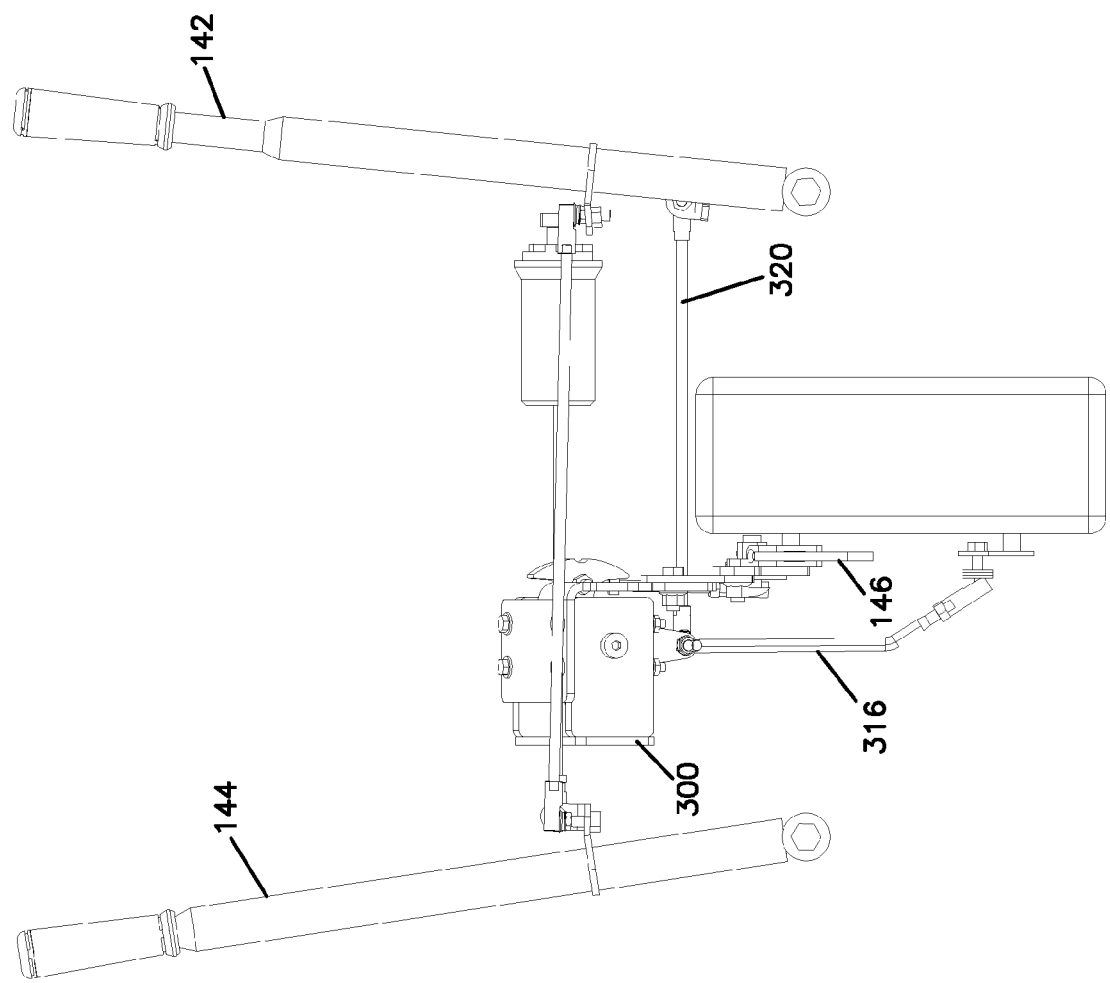
FIG. 28 is a top view of the steering control system of FIG. 15 with the propulsion control handle moved to the forward position and the leveraging arms in the centered position.
Figure 29:
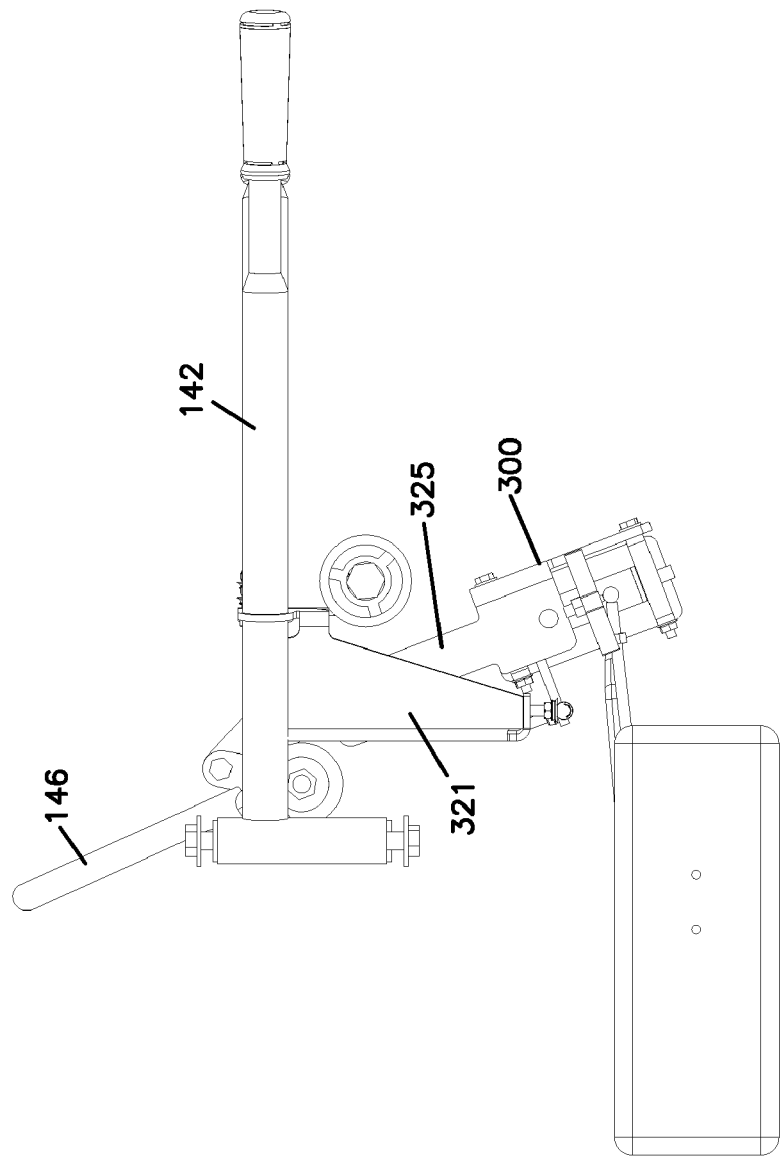
FIG. 29 is a left side view of the steering control system of FIG. 15 with the propulsion control handle moved to the forward position and the leveraging arms in the centered position.
Figure 30:
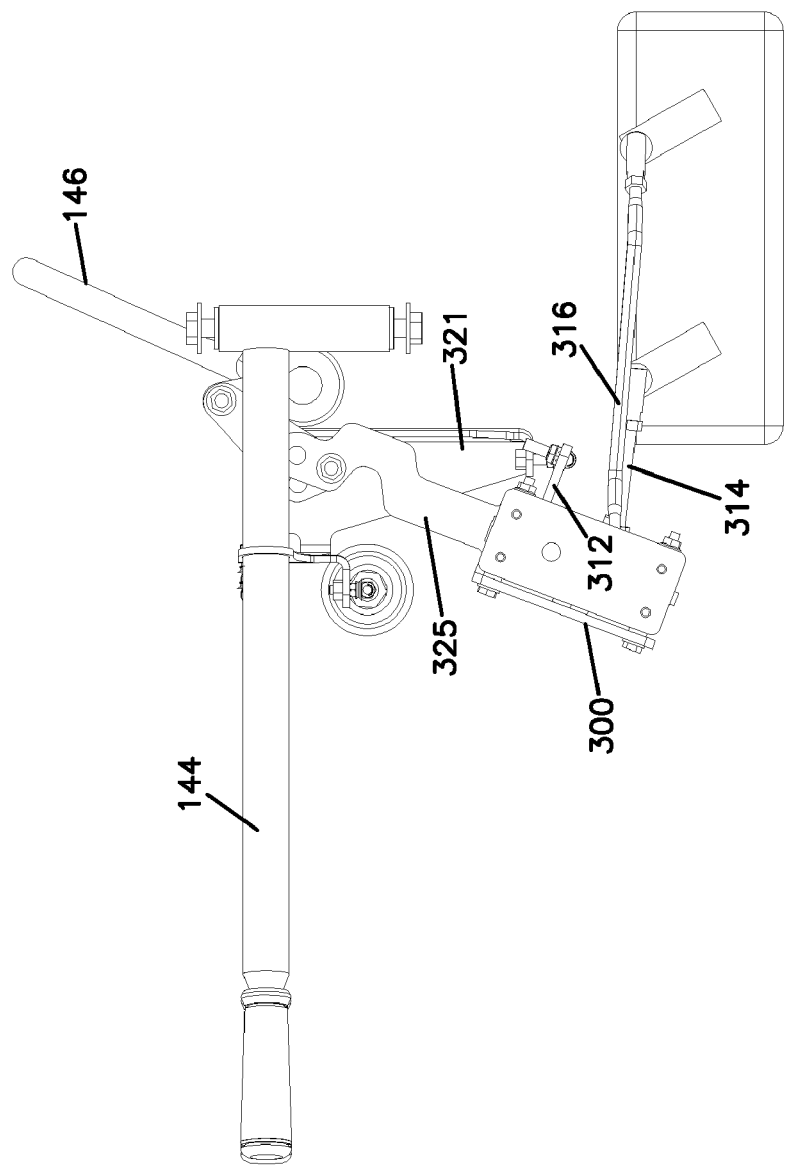
FIG. 30 is a right side view of the steering control system of FIG. 15 with the propulsion control handle moved to the forward position and the leveraging arms in the centered position.
Figure 31:
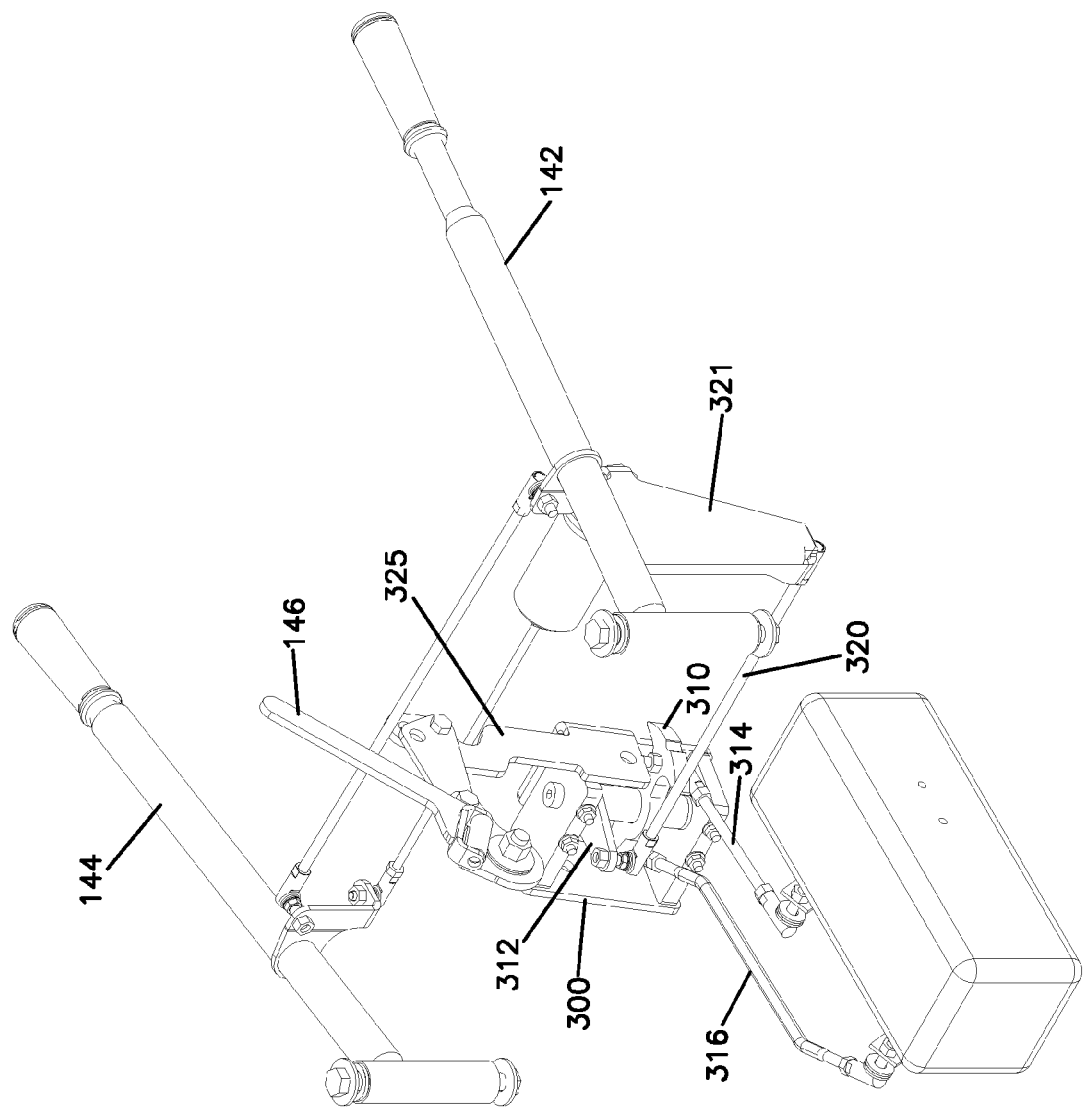
FIG. 31 is a perspective view of the steering control system of FIG. 15 with the propulsion control lever in a reverse position and the leveraging arms in the centered position.
Figure 32:
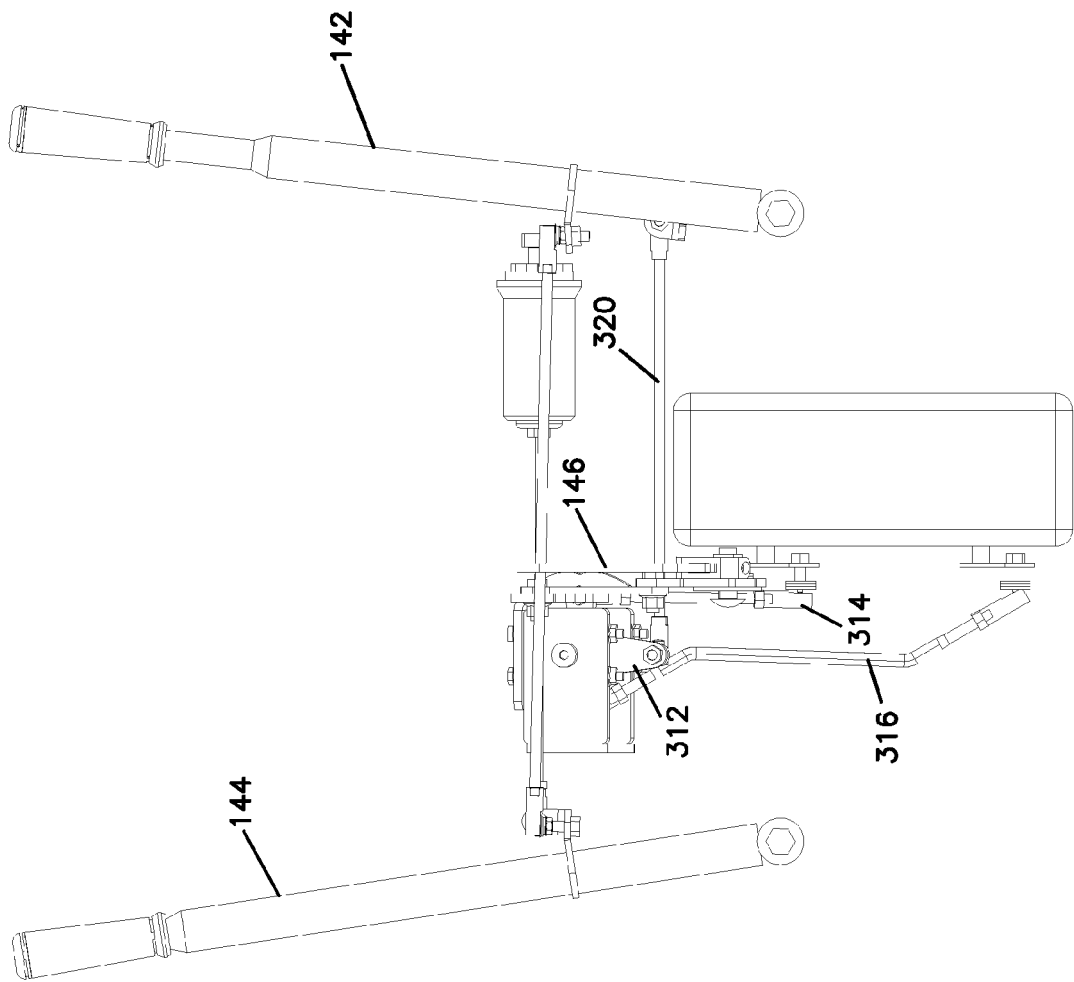
FIG. 32 is a top view of the steering control system of FIG. 15 with the propulsion control lever in the reverse position and the leveraging arms in the centered position.
Figure 33:
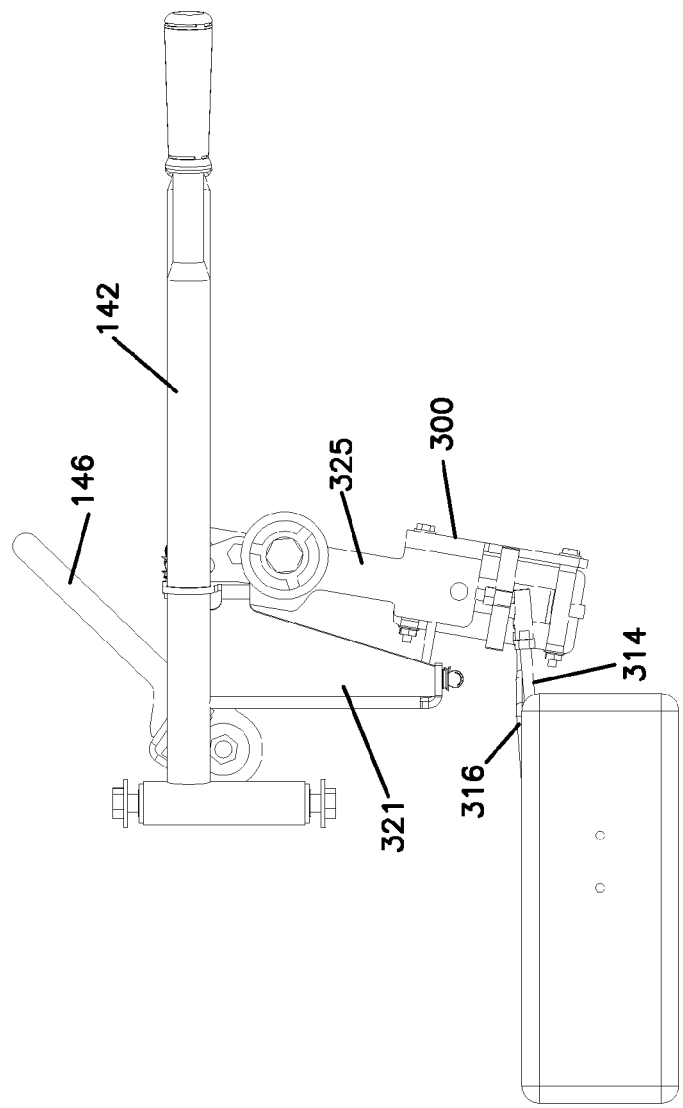
FIG. 33 is a left side view of the steering control system of FIG. 15 with the propulsion control lever in the reverse position and the leveraging arms in the centered position.
Figure 34:
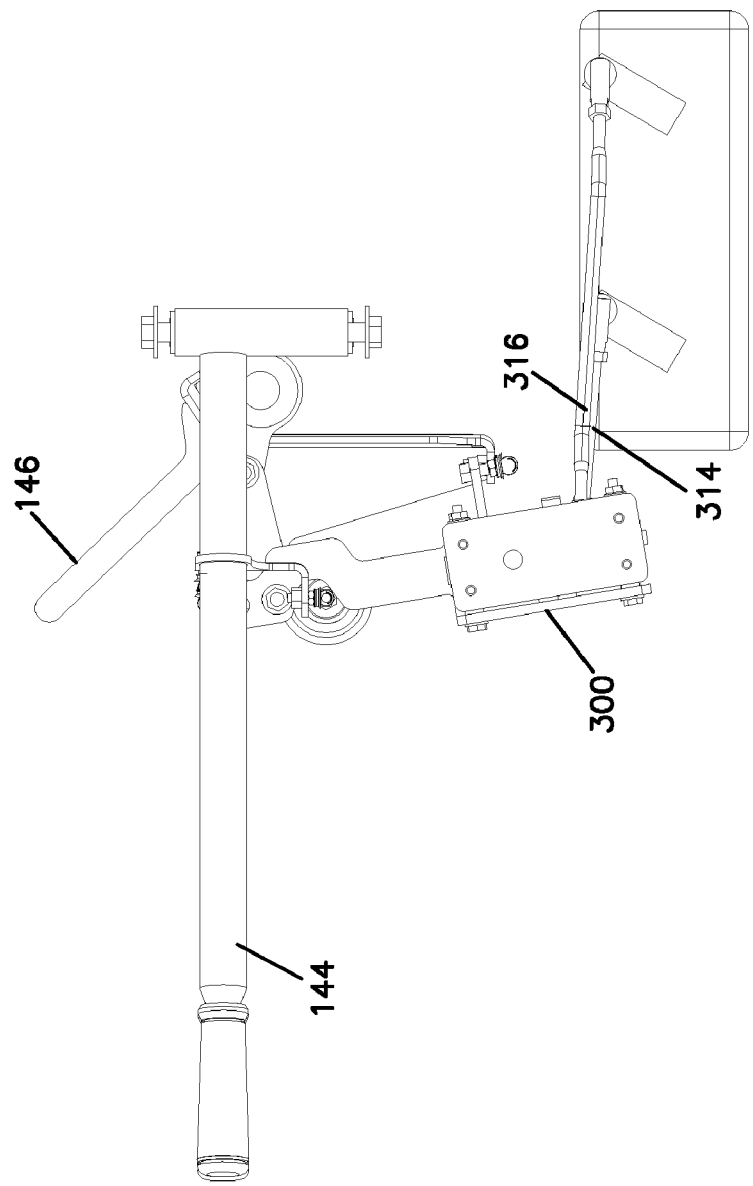
FIG. 34 is a right side view of the steering control system of FIG. 15 with the propulsion control lever in the reverse orientation and the leveraging arms in the centered orientation.

Referring again to FIG. 15, a manipulator block 300 is provided as a central component of the mechanical linkage arrangement. The manipulator block includes a top wall 301 positioned opposite from a bottom wall 303. A pivot shaft 304 extends between the upper and lower plates 301, 303. The pivot shaft 304 is rotatable relative to the plates 301, 303 about an axis of rotation 306. A first member 310 is fixedly connected to the pivot shaft 304. The first member 310 includes first and second movement arms 310*a*, 310*b* (see FIGS. 15 and 23) that project radially outwardly from opposite sides of the pivot shaft 304. A second member 312 is fixedly connected to the pivot shaft 304 at a location above the first member 310. The second member 312 forms a moment arm that projects outwardly from the axis of rotation 306 at an orientation offset approximately 90° relative to the direction the movement arms 310*a*, 310*b* project outwardly from the pivot axis 306.

Figure 12:
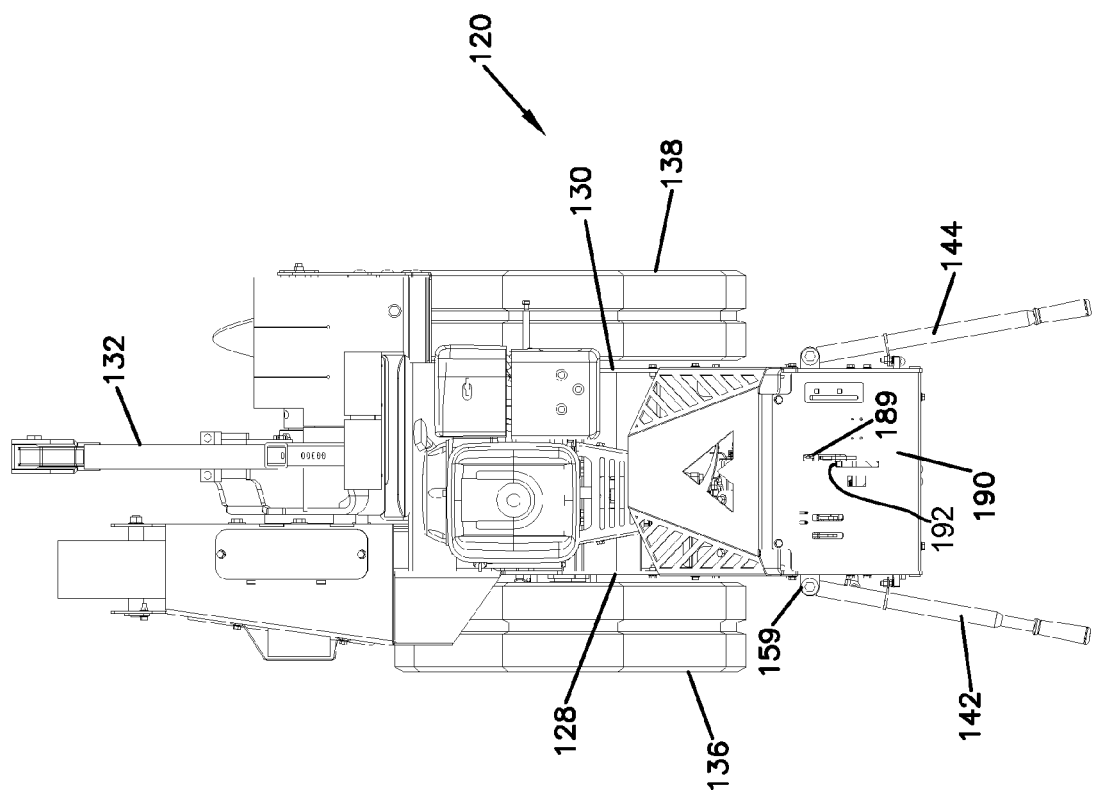
FIG. 12 is a top view of the trencher of FIG. 10.
Figure 13:
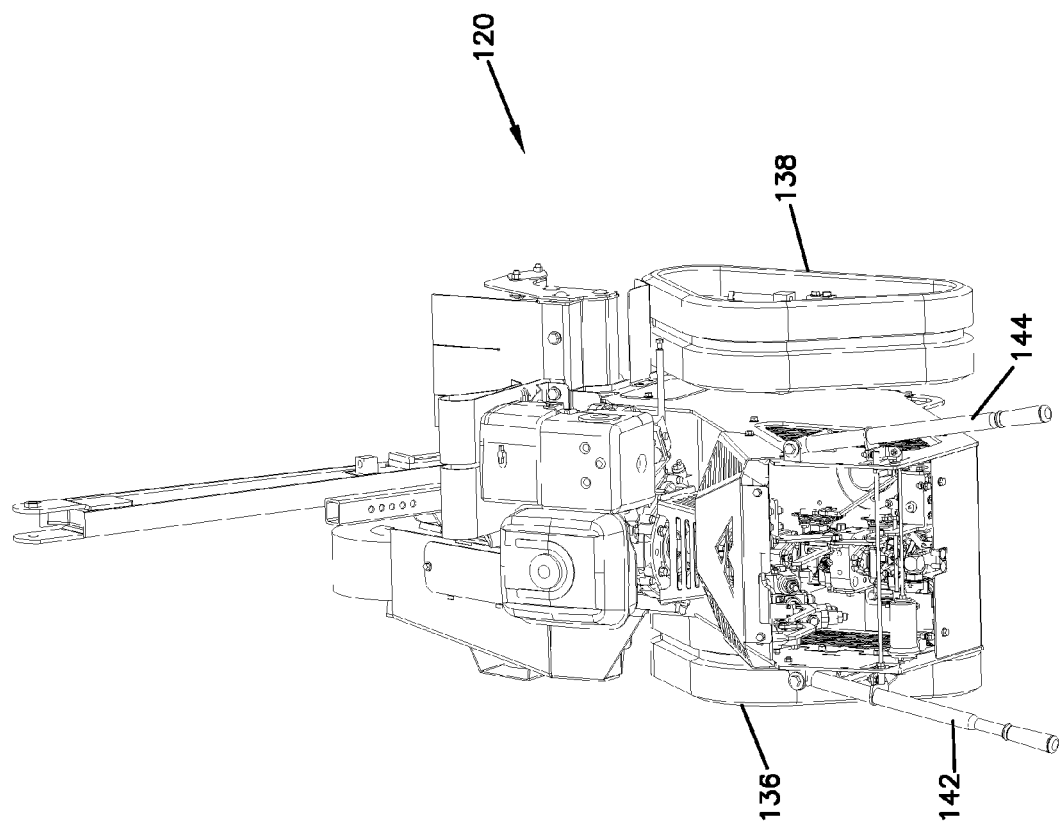
FIG. 13 is a first, rear perspective view of the trencher of FIG. 10.
Figure 14:
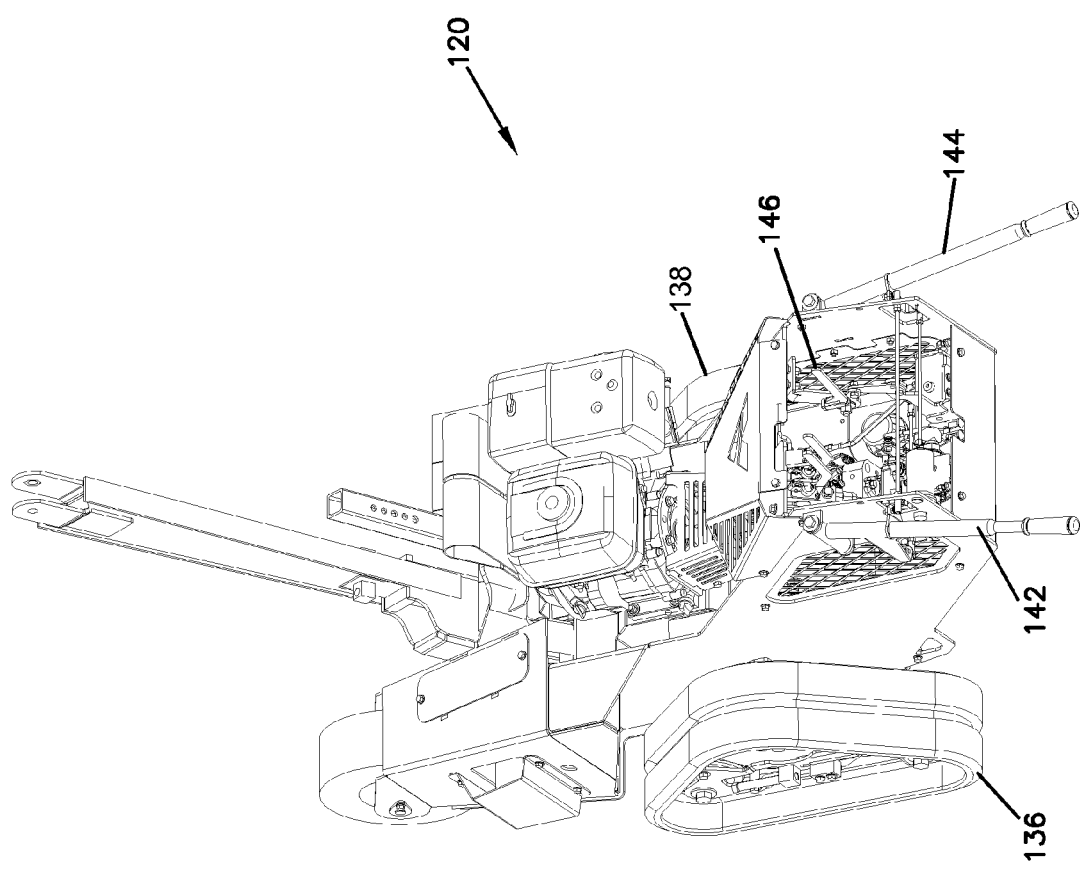
FIG. 14 is a second, rear perspective view of the trencher of FIG. 10.

The mechanical linkage arrangement includes a first linkage that mechanically couples the propulsion control lever 146 to the manipulator block 300. The first linkage includes a plate 325 fixedly connected to the manipulator block 300. The plate 325 includes a pivot location 327 where the plate 325 pivotally connects to the frame 122 of the trencher 120. The pivot location 327 allows the plate 325 and the manipulator block 300 attached to the plate 325 to pivot about a horizontal axis 329 relative to the frame 122. An upper end of the plate 325 is pivotally connected to one end of plate 330 by pin 331. The other end of plate 330 is pivotally connected to plate 332 by pin 333. Plate 332 is pivotally connected to the frame 122 by pin 335 such that the plate 332 can pivot relative to the frame 122 about a horizontal pivot axis 337. The propulsion control lever 146 is pivotally connected to the plate 332 so that the propulsion control lever 146 can pivot back and forth about a generally horizontal axis 340. As shown at FIG. 12, the propulsion control lever 146 projects through a slot 189 defined in the control panel 190. The slot 189 has a jog 192 at its middle location corresponding to the neutral position. The pivotal movement of the propulsion control lever 146 about the axis 340 allows the lever 146 to follow the jog 192 in the slot 189 as the lever is moved from the reverse position through the neutral position to the forward position, and from the forward position through the neutral position to the reverse position.

The mechanical linkage arrangement also includes a second linkage that mechanically connects the manipulator block 300 to the pump 180. Referring to FIG. 15, the second linkage includes a rod 314 that extends from the moment arm 310a to the control member 200 of the pump 180. One end of the rod 314 is pivotally connected to the moment arm 310a so as to allow pivotal movement relative to the moment arm 310a about a vertical pivot axis. The other end of the rod 314 is pivotally connected to the control member 200 so as to allow pivotal movement relative to the control member 200 about a horizontal pivot axis. The rod 314 is has a straight configuration.

The mechanical linkage arrangement also includes a third linkage that mechanically connects the manipulator block 300 to the pump 181. Referring to FIG. 15, the third linkage includes a rod 316 that extends from the moment arm 310b to the control member 201 of the pump 181. One end of the rod 316 is pivotally connected to the moment arm 310b so as to allow pivotal movement relative to the moment arm 310b about a vertical pivot axis. The other end of the rod 316 is pivotally connected to the control member 201 so as to allow pivotal movement relative to the control member 200 about a horizontal pivot axis. The rod 316 has end portions that are straight and connected by a jog portion. The rod 314 and the rod 316 are co-planar when the lever 146 is in the neutral position.

The mechanical linkage arrangement also includes a fourth linkage that mechanically couples the leveraging arms 142, 144 to the manipulator block 300. The fourth linkage includes a rod 320 that extends from the moment arm 312 to a lower end of a bracket 321. One end of the rod 320 is pivotally connected to the moment arm 312 so as to allow pivotal movement relative to the moment arm 310b about a vertical pivot axis. The other end of the rod 320 is pivotally connected to the bracket 321 so as to allow pivotal movement relative to the bracket 321 about a vertical pivot axis. The rod 320 is straight and parallel to the rods 314, 316. An upper end of the bracket 321 is fixedly connected to the left leveraging arm 142.

Similar to the previous embodiment, the propulsion control lever 146 is movable between a forward position, a neutral position, and a reverse position. Also similar to the previous embodiment, the leveraging arms 142, 144 are pivotally movable between a centered position, a left position, and a right position. When the handles are in the centered position with the propulsion control lever 146 in neutral, the trencher remains stationary. The linkage configuration for when the propulsion control lever 146 is in the neutral position and the leveraging arms 142, 144 are in the centered position is shown at FIGS. 15-18. In this configuration, the manipulator block 300 is oriented upright such that the pivot axis 306 is vertical and the rods 314, 316 function to position the control members 200, 201 in neutral positions in which the pumps 180, 181 do not provide hydraulic fluid flow to their corresponding hydraulic motors 183, 184.

To cause the trencher 120 to turn in a zero turn radius in a counter-clockwise direction, the leveraging arms 142, 144 are pivoted rightwardly as shown at FIGS. 19-22 while the propulsion control lever 146 remains in neutral. When the leveraging arms 142, 144 are pivoted rightwardly, the fourth linkage turns the pivot shaft 304 clockwise about the pivot axis 306. As the pivot shaft 304 pivots, the moment arm 310a causes the rod 314 to pull the pump control 200 rearwardly and the moment arm 310b cause the rod 316 to push the pump control 201 forwardly. When this occurs the pumps 180, 181 via hydraulic motors 183, 184 drive the tracks 136, 138 in opposite directions, causing the trencher to rotate in place counter-clockwise about a vertical axis of the trencher.

To cause the trencher 120 to turn in a zero turn radius in a clockwise direction, the leveraging arms 142, 144 are pivoted leftwardly as shown at FIGS. 23-26 while the propulsion control lever 146 remains in neutral. When the leveraging arms 142, 144 are pivoted leftwardly, the fourth linkage turns the pivot shaft 304 counter-clockwise about the pivot axis 306. As the pivot shaft 304 pivots, the moment arm 310a causes the rod 314 to push the pump control 200 forwardly and the moment arm 310b cause the rod 316 to pull the pump control 201 rearwardly. When this occurs the pumps 180, 181 via hydraulic motors 183, 184 drive the tracks 136, 138 in opposite directions, causing the trencher to rotate in place clockwise about a vertical axis of the trencher.

When the propulsion control lever 146 is moved from the neutral position to the forward position, the first linkage pivots the manipulator block 300 about horizontal axis 329 from the upright position of FIGS. 15-26 to a forwardly tilted position as shown at FIGS. 27-30. In the forwardly tilted position, the axis of rotation 306 of the pivot shaft 304 extends forwardly as the axis extends in an upward direction. When the manipulator block 300 tilts forward, rods 314 and 316 pull back on the pump control members 200, 201, causing the trencher to be propelled in a straight forward direction. If the leveraging arms 142, 144 are pivoted to the rightward position while the propulsion control lever 146 is in the forward position, the fourth linkage rotates the pivot shaft 304 in a clockwise direction which causes rod 314 to push pump control 200 slightly forward and also causes and rod 316 to pull pump control 201 slightly rearwardly. This causes the hydraulic pumps 180, 181 and their corresponding hydraulic motors 183, 184 to drive the right track 138 forwardly slightly faster than the left track 136, thereby causing the trencher to turn left as the trencher is propelled forwardly. Similarly, if the leveraging arms 142, 144 are pivoted to the leftward position while the propulsion control lever 146 is in the forward position, the fourth linkage rotates the pivot shaft 304 in a counterclockwise direction which causes rod 314 to pull pump control 200 slightly backward and also causes and rod 316 to push pump control 201 slightly forward. This causes the hydraulic pumps 180, 181 and their corresponding hydraulic motors 183, 184 to drive the left track 136 forwardly slightly faster than the right track 138, thereby causing the trencher to turn right as the trencher is propelled forwardly.

When the propulsion control lever 146 is moved from the neutral position to the reverse position, the first linkage pivots the manipulator block 301 about horizontal axis 329 from the upright position of FIGS. 15-26 to a rearwardly tilted position as shown at FIGS. 31-34. In the rearwardly tilted position, the axis of rotation 306 of the pivot shaft 304 extends rearwardly as the axis extends in an upward direction. When the manipulator block tilts rearward, rods 314 and 316 push forward on the pump control members 200, 201, causing the trencher to be propelled in a straight rearward direction. If the leveraging arms 142, 144 are pivoted to the rightward position while the propulsion control lever 146 is in the rearward position, the fourth linkage rotates the pivot shaft 304 in a clockwise direction which causes rod 314 to push pump control 200 slightly forward and also causes and rod 316 to pull pump control 201 slightly rearwardly. This causes the hydraulic pumps 180, 181 and their corresponding hydraulic motors 183, 184 to drive the left track 136 rearwardly slightly faster than the right track 138, thereby causing the trencher to turn right as the trencher is propelled rearwardly. Similarly, if the leveraging arms 142, 144 are pivoted to the leftward position while the propulsion control lever 146 is in the forward position, the fourth linkage rotates the pivot shaft 304 in a counterclockwise direction which causes rod 314 to pull pump control 200 slightly backward and also causes and rod 316 to push pump control 201 slightly forward. This causes the hydraulic pumps 180, 181 and their corresponding hydraulic motors 183, 184 to drive the right track 138 rearwardly slightly faster than the left track 136, thereby causing the trencher to turn left as the trencher is propelled forwardly.

While various pivot axes have been described as "horizontal" or "vertical", it will be appreciated that these orientations correspond with the lever 146 in the neutral position. Moreover, the pivot axes may have tolerances or play sufficient to prevent binding when the linkages are manipulated.

During trenching operations, the operator typically lowers the trenching boom 132 and then operates the work unit 120 in reverse during trenching. Thus, during trenching operations, the operator typically walks backwards as the trenching boom excavates soil while the work unit 120 is propelled in reverse. When not performing trenching operations, the work unit is typically propelled in either of the forward or reverse directions to assist the operator in maneuvering the work unit to a desired location.

The preceding embodiments are intended to illustrate without limitation the utility and scope of the present disclosure. Those skilled in the art will readily recognize various modifications and changes that may be made to the embodiments described above without departing from the true spirit and scope of the disclosure.

We claim:

1. A work unit with power turning comprising:
a frame having a first end, a second end, and left and right sides that extend between the first and second ends;
a work element carried by the frame;
a left propulsion element positioned at the left side of the frame and a right propulsion element positioned at the right side of the frame;
a drive arrangement carried by the frame for driving the left and right propulsion elements; and
left and right spaced-apart leverage arms that project outwardly from the second end of the frame, at least one of the left and right leverage arms being operatively connected to the drive arrangement such that pressure applied by an operator to the left or right leverage arms in a left or right direction causes the drive arrangement to turn the work unit;
wherein the left and right leverage arms are pivotally connected to the frame at separate pivot axes such that the left and right leverage arms can pivot left and right relative to the frame;
wherein the left and right leverage arms are linked together so that the left and right leverage arms pivot together as a unit relative to the frame;
wherein the left and right leverage arms project outwardly from the frame a distance of at least 12 inches; and
wherein the work unit is a walk-behind work unit, wherein the left and right leverage arms angle away from one another as the left and right leverage arms project outwardly from the frame, and wherein the work unit is configured such that the operator stands between the left and right leverage arms as the operator walks with the work unit.

2. A work unit with power turning comprising:
a frame having a first end, a second end, and left and right sides that extend between the first and second ends;
a work element carried by the frame;
a left propulsion element positioned at the left side of the frame and a right propulsion element positioned at the right side of the frame;
a drive arrangement carried by the frame for driving the left and right propulsion elements; and
left and right spaced-apart leverage arms that project outwardly from the second end of the frame, at least one of the left and right leverage arms being operatively connected to the drive arrangement such that pressure applied by an operator to the left or right leverage arms in a left or right direction causes the drive arrangement to turn the work unit;
wherein the left and right leverage arms are pivotally connected to the frame at separate pivot axes such that the left and right leverage arms can pivot left and right relative to the frame;
wherein the left and right leverage arms are linked together so that the left and right leverage arms pivot together as a unit relative to the frame; and
wherein the left and right leverage arms are pivotally movable relative to the frame between a left position, a right position and a centered position.

3. The work unit of claim 2, wherein when the left and right leverage arms are in the centered position, the left and right leverage arms respectively angle outwardly in left and right directions as the left and right leverage arms extend outwardly from the frame.

4. The work unit of claim 2, wherein the left and right leverage arms are spring biased toward the centered position.

5. A work unit with power turning comprising:
a frame having a first end, a second end, and left and right sides that extend between the first and second ends;
a work element carried by the frame;
a left propulsion element positioned at the left side of the frame and a right propulsion element positioned at the right side of the frame;
a drive arrangement carried by the frame for driving the left and right propulsion elements;
left and right spaced-apart leverage arms that project outwardly from the second end of the frame, at least one of the left and right leverage arms being operatively connected to the drive arrangement such that pressure applied by an operator to the left or right leverage arms in a left or right direction causes the drive arrangement to turn the work unit;

wherein the left and right leverage arms are pivotally connected to the frame at separate pivot axes such that the left and right leverage arms can pivot left and right relative to the frame;

wherein the left and right leverage arms are linked together so that the left and right leverage arms pivot together as a unit relative to the frame; and a control panel positioned at the second end of the frame and a propulsion control member positioned at the control panel, the propulsion control member being movable between a forward position, a neutral position and a reverse position.

6. The work unit of claim 5, wherein the propulsion control member is configured to remain in the forward position and the reverse position without operator assistance so that the operator can grasp both of the left and right leverage arms during forward and reverse movement of the work unit.

7. The work unit of claim 6, further comprising an operator presence detector provided on at least one of the left and right leverage arms.

8. A work unit with power turning comprising:
a frame having a front end, a back end, a left side and a right side;
a work element carried by the frame;
a left propulsion element positioned at the left side of the frame and a right propulsion element positioned at the right side of the frame;
a drive arrangement carried by the frame for driving the left and right propulsion elements;
a propulsion control member positioned at the back end of the frame, the propulsion control member being operatively connected to the drive arrangement and being movable between a forward position where the drive arrangement causes the left and right propulsion elements to propel the work unit in a forward direction, a neutral position and a reverse position where the drive arrangement causes the left and right propulsion elements to propel the work unit in a reverse direction;
left and right spaced-apart leverage arms that project rearwardly from the back end of the frame, the left and right leverage arms being pivotally connected to the frame at separate pivot axes and being pivotally movable relative to the frame between a centered position, a left position and a right position, at least one of the left and right leverage arms being operatively connected to the drive arrangement such that pivoting of the left and right leverage arms provides drive arrangement assisted steering of the work unit; and
wherein the left and right leverage arms are linked together so that the left and right leverage arms pivot together as a unit relative to the frame.

9. The work unit of claim 8, wherein the propulsion control member is configured to remain in the forward position and the reverse position without operator assistance so that an operator can grasp both of the left and right leverage arms during forward and reverse movement of the work unit.

10. A work unit with turning comprising:
a frame having a front end, a back end, a left side and a right side;
a work element carried by the frame;
a left propulsion element positioned at the left side of the frame and a right propulsion element positioned at the right side of the frame;
a drive arrangement carried by the frame for driving the left and right propulsion elements;
a propulsion control member positioned at the back end of the frame, the propulsion control member being operatively connected to the drive arrangement and being movable between a forward position where the drive arrangement causes the left and right propulsion elements to propel the work unit in a forward direction, a neutral position and a reverse position where the drive arrangement causes the left and right propulsion elements to propel the work unit in a reverse direction, wherein the propulsion control member is configured to remain in the forward position and the reverse position without operator assistance so that an operator can grasp both of a left and a right spaced-apart leverage arm during forward and reverse movement of the work unit;
wherein the left and right spaced-apart leverage arms project rearwardly from the back end of the frame, the left and right leverage arms being pivotally connected to the frame at separate pivot axes and being pivotally movable relative to the frame between a centered position, a left position and a right position, at least one of the left and right leverage arms being operatively connected to the drive arrangement such that pivoting of the left and right leverage arms provides drive arrangement assisted steering of the work unit; and
an operator presence detector provided on at least one of the left and right leverage arms.

11. A work unit with turning comprising:
a frame having a front end, a back end, a left side and a right side;
a work element carried by the frame;
a left propulsion element positioned at the left side of the frame and a right propulsion element positioned at the right side of the frame;
a drive arrangement carried by the frame for driving the left and right propulsion elements;
a propulsion control member positioned at the back end of the frame, the propulsion control member being operatively connected to the drive arrangement and being movable between a forward position where the drive arrangement causes the left and right propulsion elements to propel the work unit in a forward direction, a neutral position and a reverse position where the drive arrangement causes the left and right propulsion elements to propel the work unit in a reverse direction;
left and right spaced-apart leverage arms that project rearwardly from the back end of the frame, the left and right leverage arms being pivotally connected to the frame at separate pivot axes and being pivotally movable relative to the frame between a centered position, a left position and a right position, at least one of the left and right leverage arms being operatively connected to the drive arrangement such that pivoting of the left and right leverage arms provides drive arrangement assisted steering of the work unit; and
wherein when the propulsion control member is in the neutral position and the left and right leverage arms are in the left position, the drive arrangement drives the left propulsion element in a forward direction and the right propulsion element in a reverse direction to provide zero radius turning in a clockwise direction, and wherein when the propulsion control member is in the neutral position and the left and right leverage arms are in the right position, the drive arrangement drives the left propulsion element in a reverse direction and the right propulsion element in a forward direction to provide zero radius turning in a counterclockwise direction.

12. The work unit of claim 11, wherein when the propulsion control member is in the forward position and the left and right leverage arms are in the centered position, the drive arrangement drives the left and right propulsion elements forward at a same speed to propel the work unit straight forward, wherein when the propulsion control member is in the forward position and the left and right leverage arms are in the left position, the drive arrangement drives the left propulsion element forwardly at a faster speed than the right propulsion element causing the work unit to turn right as the work unit is propelled forward, and wherein when the propulsion control member is in the forward position and the left and right leverage arms are in the right position, the drive arrangement drives the right propulsion element forwardly at a faster speed than the left propulsion element causing the work unit to turn left as the work unit is propelled forward.

13. The work unit of claim 12, wherein when the propulsion control member is in the reverse position and the left and right leverage arms are in the centered position, the drive arrangement drives the left and right propulsion elements in reverse at a same speed to propel the work unit straight back, wherein when the propulsion control member is in the reverse position and the left and right leverage arms are in the left position, the drive arrangement drives the right propulsion element in reverse at a faster speed than the left propulsion element causing the work unit to turn left as the work unit is propelled backward, and wherein when the propulsion control member is in the reverse position and the left and right leverage arms are in the right position, the drive arrangement drives the left propulsion element in reverse at a faster speed than the right propulsion element causing the work unit to turn right as the work unit is propelled backward.

14. A work unit with power turning comprising:
a frame having a front end, a back end, a left side and a right side;
a work element carried by the frame;
a left propulsion element positioned at the left side of the frame and a right propulsion element positioned at the right side of the frame;
a drive arrangement carried by the frame for driving the left and right propulsion elements, the drive arrangement including a first hydraulic pump and a first hydraulic motor for driving the left propulsion element, and a second hydraulic pump and a second hydraulic motor for driving the right propulsion element;
a propulsion control member positioned at the back end of the frame, the propulsion control member being operatively connected to the drive arrangement and being movable between a forward position where the drive arrangement causes the left and right propulsion elements to propel the work unit in a forward direction, a neutral position and a reverse position where the drive arrangement causes the left and right propulsion elements to propel the work unit in a reverse direction;
left and right spaced-apart leverage arms that project rearwardly from the back end of the frame, the left and right leverage arms being pivotally connected to the frame and being pivotally movable relative to the frame between a centered position, a left position and a right position;
a manipulator block coupled to the propulsion control member by a first linkage, the manipulator block being pivotally connected to the frame about a first pivot axis, wherein movement of the propulsion control member between the forward, reverse and neutral positions causes the manipulator block to pivot about the first pivot axis;
a pivot member pivotally mounted to the manipulator block, the pivot member being pivotally movable relative to the manipulator block about a second pivot axis;
a second linkage that connects the pivot member to the first hydraulic pump and a third linkage that connects the pivot member to the second hydraulic pump, the first and second linkages moving in opposite directions as the pivot member is pivoted about the second pivot axis; and
a fourth linkage that couples at least one of the left and right leverage arms to the pivot member, wherein pivotal movement of the left and right leverage arms causes pivotal movement of the pivot member about the second pivot axis.

15. A work unit with power turning comprising:
a frame having a front end, a back end, a left side and a right side;
a work element carried by the frame;
a left propulsion element positioned at the left side of the frame and a right propulsion element positioned at the right side of the frame;
a drive arrangement carried by the frame for driving the left and right propulsion elements, the drive arrangement including a first hydraulic pump and a first hydraulic motor for driving the left propulsion element, and a second hydraulic pump and a second hydraulic motor for driving the right propulsion element;
a propulsion control member operatively connected to the drive arrangement and being movable between a forward position where the drive arrangement causes the left and right propulsion elements to propel the work unit in a forward direction, a neutral position and a reverse position where the drive arrangement causes the left and right propulsion elements to propel the work unit in a reverse direction;
left and right spaced-apart steering members, the left and right steering members being pivotally connected to the frame and being pivotally movable relative to the frame between a centered position, a left position and a right position;
a manipulator block coupled to the propulsion control member by a first linkage, the manipulator block being pivotally connected to the frame about a first pivot axis, wherein movement of the propulsion control member between the forward, reverse and neutral positions causes the manipulator block to pivot about the first pivot axis;
a pivot member pivotally mounted to the manipulator block, the pivot member being pivotally movable relative to the manipulator block about a second pivot axis;
a second linkage that connects the pivot member to the first hydraulic pump and a third linkage that connects the pivot member to the second hydraulic pump, the first and second linkages moving in opposite directions as the pivot member is pivoted about the second pivot axis; and
a fourth linkage that couples at least one of the left and right steering members to the pivot member, wherein pivotal movement of the left and right steering members causes pivotal movement of the pivot member about the second pivot axis.

* * * * *